United States Patent
Nakanishi

(10) Patent No.: US 8,854,337 B2
(45) Date of Patent: Oct. 7, 2014

(54) OPTICAL POSITION DETECTION DEVICE, LIGHT RECEIVING UNIT, AND DISPLAY SYSTEM WITH INPUT FUNCTION

(75) Inventor: Daisuke Nakanishi, Matsumoto (JP)

(73) Assignee: Seiko Epson Corporation (JP)

(*) Notice: Subject to any disclaimer, the term of this patent is extended or adjusted under 35 U.S.C. 154(b) by 231 days.

(21) Appl. No.: 13/439,348

(22) Filed: Apr. 4, 2012

(65) Prior Publication Data

US 2012/0256825 A1 Oct. 11, 2012

(30) Foreign Application Priority Data

Apr. 6, 2011 (JP) ................................ 2011-084238

(51) Int. Cl.
| | | |
|---|---|---|
| *G09G 5/00* | (2006.01) | |
| *G01C 21/00* | (2006.01) | |
| *G01S 7/481* | (2006.01) | |
| *G01S 17/87* | (2006.01) | |
| *G01S 17/46* | (2006.01) | |
| *G06F 3/03* | (2006.01) | |

(52) U.S. Cl.
CPC .............. *G01S 17/46* (2013.01); *G01S 7/4814* (2013.01); *G01S 17/87* (2013.01); *G06F 3/0325* (2013.01); *G01S 7/4816* (2013.01)
USPC .... 345/175; 345/158; 178/18.09; 250/227.14

(58) Field of Classification Search
USPC ................. 345/156–158, 166, 175–176, 179; 359/869; 178/18.09–18.11, 19.05, 119; 250/330–334, 227.13–227.14
See application file for complete search history.

(56) References Cited

U.S. PATENT DOCUMENTS

| | | | |
|---|---|---|---|
| 6,953,926 B2 | 10/2005 | Reime | |
| 7,547,116 B2* | 6/2009 | Walker et al. | 362/257 |
| 2009/0283679 A1* | 11/2009 | Murayama et al. | 250/338.1 |
| 2010/0039379 A1* | 2/2010 | Hildreth | 345/156 |
| 2010/0110005 A1* | 5/2010 | Chtchetinine et al. | 345/158 |
| 2011/0062316 A1* | 3/2011 | Kiyose et al. | 250/221 |
| 2011/0074738 A1* | 3/2011 | Ye et al. | 345/175 |
| 2011/0084903 A1 | 4/2011 | Onishi | |
| 2011/0166456 A1* | 7/2011 | Yamashita et al. | 600/473 |
| 2011/0279361 A1* | 11/2011 | Onishi | 345/156 |
| 2011/0291990 A1* | 12/2011 | Kiyose et al. | 345/175 |

FOREIGN PATENT DOCUMENTS

| | | |
|---|---|---|
| JP | 2000-200148 | 7/2000 |
| JP | 2002-116428 | 4/2002 |
| JP | 2003-122504 | 4/2003 |

(Continued)

*Primary Examiner* — Lun-Yi Lao
*Assistant Examiner* — Elliott Deaderick
(74) *Attorney, Agent, or Firm* — Harness, Dickey & Pierce, P.L.C.

(57) ABSTRACT

An optical position detection device includes a light receiving section receiving detection light reflected from a target object located in a detectable space through which detection light is radially emitted along an XY plane. The light receiving section includes a light receiving element and a concave mirror. A first cross section (XY cross section) of the reflective surface of the concave mirror is an arc, and a second cross section (YZ cross section) perpendicular to the first cross section is a quadratic curve. Therefore, in the in-plane direction of the XY plane, even light incident from an oblique direction with respect to the light receiving section is reflected by the concave mirror to the light receiving element. In the in-plane direction of the YZ plane, however, the range where the light reaches the light receiving element is limited via the concave mirror.

12 Claims, 17 Drawing Sheets

(56) References Cited

FOREIGN PATENT DOCUMENTS

| JP | 2003-228458 | 8/2003 |
| JP | 2003-534554 | 11/2003 |
| JP | 2004-303172 | 10/2004 |
| JP | 2009-295318 | 12/2009 |
| JP | 2010-127671 | 6/2010 |
| JP | 2010/186217 | 8/2010 |
| JP | 2010-211355 | 9/2010 |
| JP | 2011-064936 | 3/2011 |
| JP | 2011-086649 | 4/2011 |

* cited by examiner

XY CROSS SECTION
(FIRST CROSS SECTION)

YZ CROSS SECTION
(SECOND CROSS SECTION)

XY CROSS SECTION
(FIRST CROSS SECTION)

YZ CROSS SECTION
(SECOND CROSS SECTION)

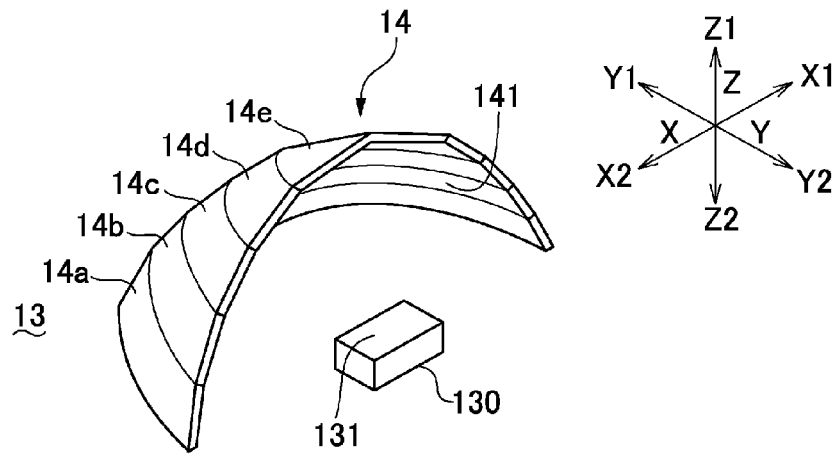
FIG.12A
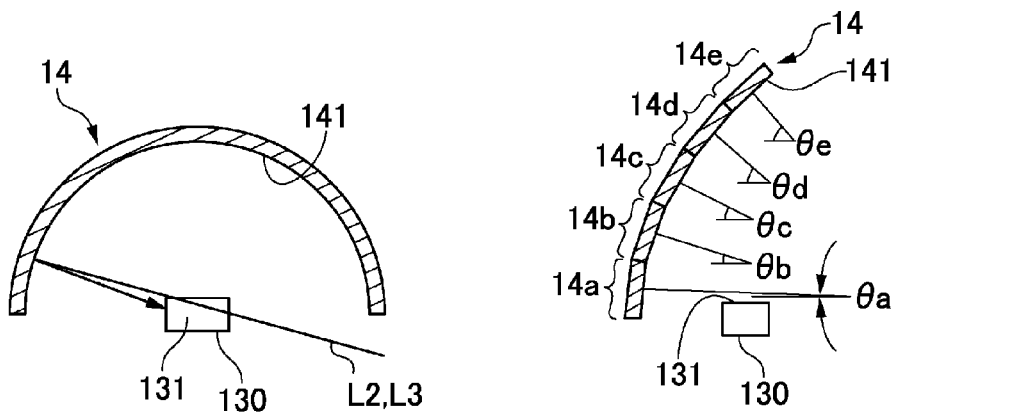
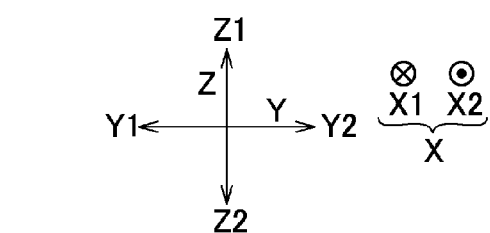
XY CROSS SECTION
(FIRST CROSS SECTION)
YZ CROSS SECTION
(SECOND CROSS SECTION)
FIG.12B   FIG.12C

OPTICAL POSITION DETECTION DEVICE, LIGHT RECEIVING UNIT, AND DISPLAY SYSTEM WITH INPUT FUNCTION

BACKGROUND

1. Technical Field

The present invention relates to an optical position detection device which optically detects the position of a target object, a light receiving unit suitable for use in the optical position detection device, and a display system with an input function including the optical position detection device.

2. Related Art

An optical position detection device has been proposed for optically detecting a target object. In the device, a plurality of point light sources are provided at positions separated from each other, and when detection light is emitted from each of the plurality of point light sources toward a target object through a light transmissive member, detection light reflected from the target object is transmitted through the light transmissive member and is then detected by a light receiving section (refer to JP-T-2003-534554). In addition, an optical position detection device has been proposed in which detection light emitted from each of a plurality of point light sources is emitted through a light guide plate and detection light reflected from a target object is detected by a light receiving section (refer to JP-A-2010-127671 and JP-A-2009-295318).

In this optical position detection device, a common light receiving section is used and the position of the target object is detected on the basis of a comparison result of the received light intensity in the light receiving section when some of the plurality of point light sources are turned on and the received light intensity in the light receiving section when some other point light sources are turned on.

If the configurations disclosed in JP-T-2003-534554, JP-A-2010-127671, and JP-A-2009-295318 are applied, two-dimensional coordinate data (for example, X coordinate data and Y coordinate data) of the target object can be obtained. In the case of using the optical position detection device as an input device or the like, there is a demand to limit the detection range in the Z-axis direction and set the detection range widely in the X-axis direction and the Y-axis direction. However, such settings are difficult to achieve in the configurations disclosed in JP-T-2003-534554, JP-A-2010-127671, and JP-A-2009-295318.

SUMMARY

An advantage of some aspects of the invention is to provide an optical position detection device capable of limiting the detection range in one direction and setting the detection range widely in an in-plane direction crossing the one direction, a light receiving unit suitable for use in the optical position detection device, and a display system with an input function including the optical position detection device.

An aspect of the invention is directed to an optical position detection device that detects a position of a target object and includes: a light source section that emits detection light; a light receiving section that receives reflected light of the detection light reflected from the target object; and a position detecting section that detects the position of the target object on the basis of a light receiving result of the light receiving section. The light receiving section includes: a concave mirror with a reflective surface whose first cross section is an arc and whose second cross section perpendicular to the first cross section is a quadratic curve; and a light receiving element that is located at the center of the arc in a plan view of the first cross section and on an axis of symmetry of the quadratic curve in a plan view of the second cross section.

In the optical position detection device according to this aspect of the invention, the light source section emits detection light, and the light receiving section receives detection light reflected from the target object located in the space to which the detection light has been emitted. Since the received light intensity in the light receiving section corresponds to the position of the target object, the position detecting section can detect the position of the target object on the basis of the received light intensity in the light receiving section. In addition, the light receiving section includes the light receiving element and the concave mirror, and the concave mirror has a reflective surface whose first cross section is an arc and whose second cross section perpendicular to the first cross section is a quadratic curve. For this reason, in the in-plane direction along the first cross section, even light incident from the oblique direction with respect to the light receiving section is reflected by the concave mirror to the light receiving element. Therefore, in the in-plane direction along the first cross section, the detectable angular range is wide. On the other hand, in the in-plane direction along the second cross section, the detectable angular range is narrow since the incidence angle of light reaching the light receiving element is limited by the concave mirror even if detection light reaches the light receiving section. Therefore, it is possible to limit the detection range in one direction while still setting the detection range to be wide in the in-plane direction crossing the one direction.

In the optical position detection device according to the aspect of the invention, it is preferable that the light receiving element be located at the center of the quadratic curve. According to such a configuration, since detection light reaching the reflective surface is efficiently reflected toward the light receiving surface of the light receiving element, the received light intensity of the light receiving section is high.

In the optical position detection device according to the aspect of the invention, it is preferable that the quadratic curve be an arc. In this case, it is preferable that the radius of curvature of the arc of the second cross section be smaller than the radius of curvature of the arc of the first cross section. According to such a configuration, the incidence angle of light reaching the light receiving element can be made narrower in the direction along the second cross section. Therefore, the detection range can be even more narrowly limited in one direction.

In the optical position detection device according to the aspect of the invention, a configuration in which the quadratic curve is a parabola may also be adopted. According to such a configuration, in the in-plane direction along the second cross section, only light parallel to the axis of the parabola reaches the light receiving element. Therefore, in the direction along the second cross section, the incidence angle of light reaching the light receiving element can be made narrower. Therefore, the detection range can be even more narrowly limited in one direction.

Another aspect of the invention is directed to an optical position detection device that detects a position of a target object and includes: a light source section that emits detection light; a light receiving section that receives reflected light of the detection light reflected from the target object; and a position detecting section that detects the position of the target object on the basis of a light receiving result of the light receiving section. The light receiving section includes: a concave mirror in which a plurality of reflective surfaces whose first cross sections are arcs and whose second cross sections perpendicular to the first cross sections are straight lines are arranged in an array along a normal line of the first cross sections; and a light receiving element that is located at the center of the arcs of the plurality of reflective surfaces in a plan view of the first cross section. An angle formed by a normal line of each of the reflective surfaces and the first cross section increases as a distance from the light receiving element increases along the normal line of the first cross section. According to such a configuration, in the in-plane direction along the second cross section, only light parallel or approximately parallel to the axis of the reflective surfaces reaches the light receiving element, similar to the case where the second cross section is a parabola. Therefore, it is possible to limit the detection range in one direction while still setting the detection range to be wide in the in-plane direction crossing the one direction. Moreover, when forming the concave mirror, it is only necessary to combine a plurality of conical members in the normal direction of the first cross section. Therefore, the manufacturing of the concave mirror is easy.

The invention may also be configured as a light receiving unit. That is, according to still another aspect of the invention, there is provided a light receiving unit including: a concave mirror with a reflective surface whose first cross section is an arc and whose second cross section perpendicular to the first cross section is a quadratic curve; and a light receiving element that is located at the center of the arc in a plan view of the first cross section and on an axis of symmetry of the quadratic curve in a plan view of the second cross section.

In the light receiving unit according to the aspect of the invention, it is preferable that the light receiving element be located at the center of the quadratic curve.

In the light receiving unit according to the aspect of the invention, the quadratic curve may be, for example, an arc. In this case, it is preferable that the radius of curvature of the arc of the second cross section be smaller than the radius of curvature of the arc of the first cross section.

In the light receiving unit according to the aspect of the invention, a configuration in which the quadratic curve is a parabola may also be adopted.

Still another aspect of the invention is directed to a light receiving unit including: a concave mirror in which a plurality of reflective surfaces whose first cross sections are arcs and whose second cross sections perpendicular to the first cross sections are straight lines are arranged in an array along a normal line of the first cross section; and a light receiving element that is located at the center of the arcs of the plurality of reflective surfaces in a plan view of the first cross sections. An angle formed by a normal line of each of the reflective surfaces and the first cross section increases as a distance from the light receiving element increases along the normal line of the first cross section.

The optical position detection device according to the aspect of the invention may also be used in various kinds of systems, such as a display system with an input function, an input system of electronic paper, a window system with an input function, and an amusement system with an input function.

When the optical position detection device according to the aspect of the invention is applied to a display system with an input function, for example, the display system with an input function includes: a light source section that emits detection light; a light receiving section that receives reflected light of the detection light reflected from the target object; a position detecting section that detects a position of the target object on the basis of a light receiving result of the light receiving section; and a display section in which an image displayed on a display surface is switched on the basis of a position detection result of the position detecting section. The light receiving section includes: a concave mirror with a reflective surface whose first cross section is an arc and whose second cross section perpendicular to the first cross section is a quadratic curve; and a light receiving element that is located at the center of the arc in a plan view of the first cross section and on an axis of symmetry of the quadratic curve in a plan view of the second cross section. In this case, it is preferable that the light receiving element be located at the center of the quadratic curve.

Yet another aspect of the invention is directed to a display system with an input function including: a light source section that emits detection light; a light receiving section that receives reflected light of the detection light reflected from the target object; a position detecting section that detects a position of the target object on the basis of a light receiving result of the light receiving section; and a projection type display section in which a projected image is switched on the basis of a position detection result of the position detecting section is switched. The light receiving section includes: a concave mirror with a reflective surface whose first cross section is an arc and whose second cross section perpendicular to the first cross section is a quadratic curve; and a light receiving element that is located at the center of the arc in a plan view of the first cross section and on an axis of symmetry of the quadratic curve in a plan view of the second cross section. In this case, it is preferable that the light receiving element be located at the center of the quadratic curve.

BRIEF DESCRIPTION OF THE DRAWINGS

The invention will be described with reference to the accompanying drawings, wherein like numbers reference like elements.

FIGS. 12A to 12C are explanatory views of a light receiving element and a concave mirror used in a light receiving section (light receiving unit) of an optical position detection device according to a third embodiment of the invention.

DESCRIPTION OF EXEMPLARY EMBODIMENTS

Figure 1A:
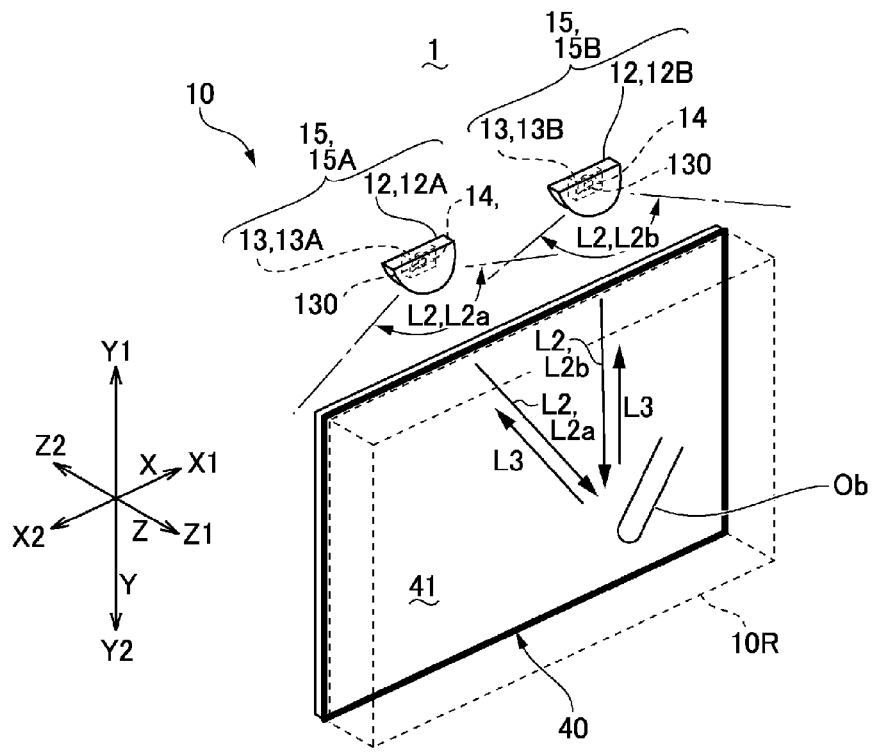
FIGS. 1A and 1B are explanatory views schematically showing sections of an optical position detection device according to a first embodiment of the invention.

Next, embodiments of the invention will be described with reference to the accompanying drawings. In the following explanation, it is assumed that directions crossing each other are the X-axis direction and the Y-axis direction and a direction crossing the X-axis direction and the Y-axis direction is the Z-axis direction. Moreover, in the drawings referred to below, the opposite sides of the X-axis direction are respectively expressed as X1 and X2 sides, the opposite sides of the Y-axis direction are respectively expressed as Y1 and Y2 sides, and the opposite sides of the Z-axis direction are respectively expressed as Z1 and Z2 sides.

First Embodiment

Overall Configuration

Figure 1B:
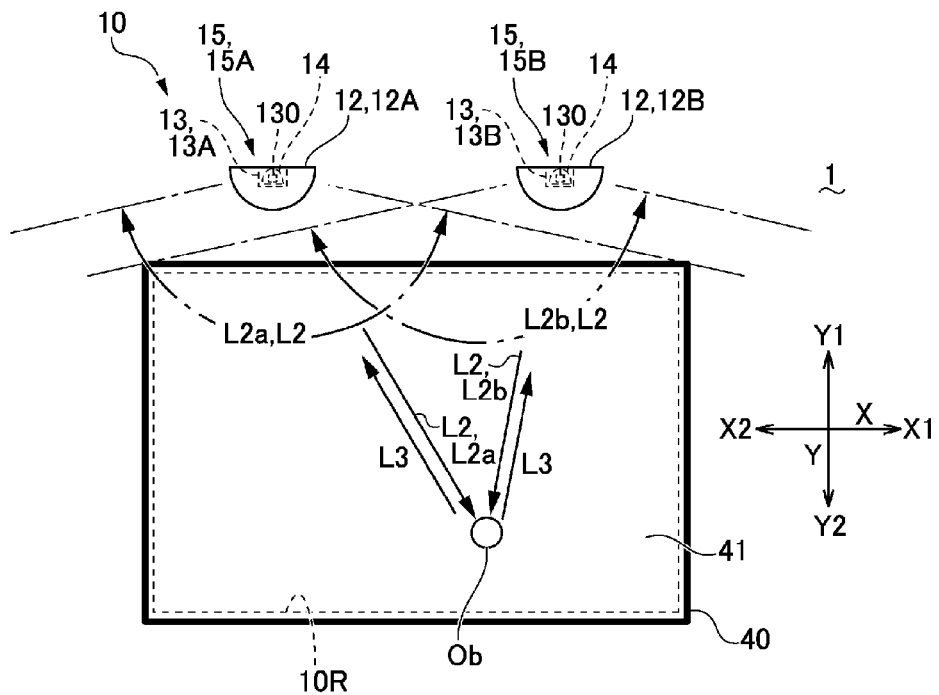

FIGS. 1A and 1B are explanatory views schematically showing sections of an optical position detection device according to a first embodiment of the invention. FIG. 1A is an explanatory view when the optical position detection device is viewed from the oblique direction at the side of a detection light emission space, and FIG. 1B is an explanatory view when the optical position detection device is viewed from the front.

In FIGS. 1A and 1B, a position detection system 1 according to the present embodiment includes an optical position detection device 10 which detects the position of a target object Ob. The optical position detection device 10 detects the position of the target object Ob using detection light L2 which is radially emitted along the virtual XY plane (virtual plane) defined by the X-axis direction and the Y-axis direction. In the present embodiment, the position detection system 1 includes a viewing surface forming member 40 having a viewing surface 41 extending along the XY plane at the one side Z1 of the Z-axis direction. The optical position detection device 10 emits the detection light L2 along the viewing surface 41, and detects the position of the target object Ob located at the viewing surface 41 side (one side Z1 of the Z-axis direction) of the viewing surface forming member 40. Accordingly, a space to be detected 10R of the position detection system 1 is a detection light emission space where the detection light L2 is emitted in the optical position detection device 10. The light intensity distribution of the detection light L2, which will be described later, is formed in the space to be detected 10R. With the optical position detection device 10, the position detection system 1 may be used as a display system with an input function such as an electronic blackboard, a projection type display system with an input function, and the like, which will be described later.

In the position detection system 1 according to the present embodiment, the optical position detection device 10 includes a light source section 12 (linear light source section), which radially emits the detection light L2 along the viewing surface 41 (XY plane), and a light receiving section 13 (light receiving unit), which receives the detection light L2 (reflected light L3) reflected from the target object Ob located in the emission space (space to be detected 10R) of the detection light L2.

In the present embodiment, two light source sections 12 (first and second light source sections 12A and 12B) which face the space to be detected 10R at positions separated from the viewing surface forming member 40 at the one side Y1 of the Y-axis direction are used as the light source section 12. The first and second light source sections 12A and 12B are separated from each other in the X-axis direction and are at the same position in the Y-axis direction. Moreover, in the present embodiment, first and second light receiving sections 13A and 13B which face the space to be detected 10R at positions separated from the viewing surface forming member 40 at the one side Y1 of the Y-axis direction are used as the light receiving section 13. The first and second light receiving sections 13A and 13B are separated from each other in the X-axis direction and are at the same position in the Y-axis direction.

Here, the first light receiving section 13A is disposed at the radiation center of the detection light L2 (detection light L2a) emitted radially from the first light source section 12A, and the first light receiving section 13A and the first light source section 12A are unified as a light emission and reception unit 15A (first light emission and reception unit 15A). In addition, the second light receiving section 13B is disposed at the radiation center of the detection light L2 (detection light L2b) emitted radially from the second light source section 12B, and the second light receiving section 13B and the second light source section 12B are unified as a light emission and reception unit 15 (second light emission and reception unit 15B).

As will be described later, each of the two light source sections 12 (first and second light source sections 12A and 12B) includes a light source (point light source) formed by a light emitting element, such as an LED (light emitting diode). The light source emits the detection light L2 (detection light L2a and L2b) of infrared light, which has a peak wavelength of 840 to 1000 nm, as diverging light. Each light receiving section 13 (each of the first and second light receiving sections 13A and 13B) includes a light receiving element 130, such as a photodiode or a phototransistor. In the present embodiment, the light receiving element 130 is a photodiode with a peak sensitivity in the infrared region. In addition, each light receiving section 13 (each of the first and second light receiving sections 13A and 13B) includes a concave mirror 14, which will be described later with reference to FIGS. 9, 10A, and 10B and the like.

The first and second light emission and reception units 15A and 15B are located at positions shifted toward the one side Z1 of the Z-axis direction from the viewing surface forming member 40. In addition, the first and second light emission and reception units 15A and 15B operate in different periods.

Therefore, when the detection light L2a is emitted from the first light source section 12A in the first light emission and reception unit 15A, the first light receiving section 13A receives the detection light L2a (reflected light L3) reflected from the target object Ob located in the space to be detected 10R. In a different period from this operation, when the detection light L2b is emitted from the second light source section 12B in the second light emission and reception unit 15B, the second light receiving section 13B receives the detection light L2b (reflected light L3) reflected from the target object Ob located in the space to be detected 10R.

Specific Configuration of the Light Source Section 12

Figure 2:
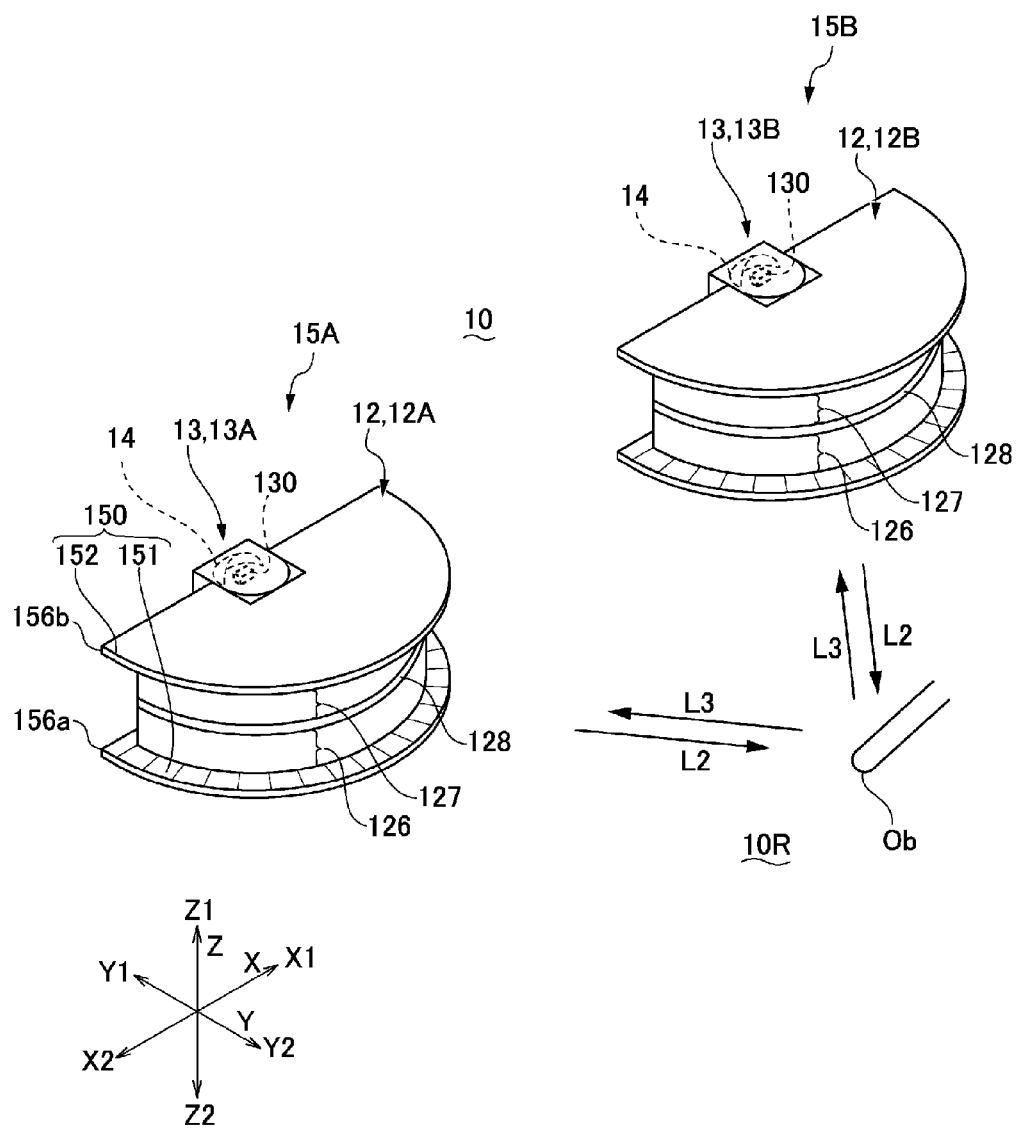
FIG. 2 is an explanatory view of a light emission and reception unit of the optical position detection device according to the first embodiment of the invention.
Figure 3:
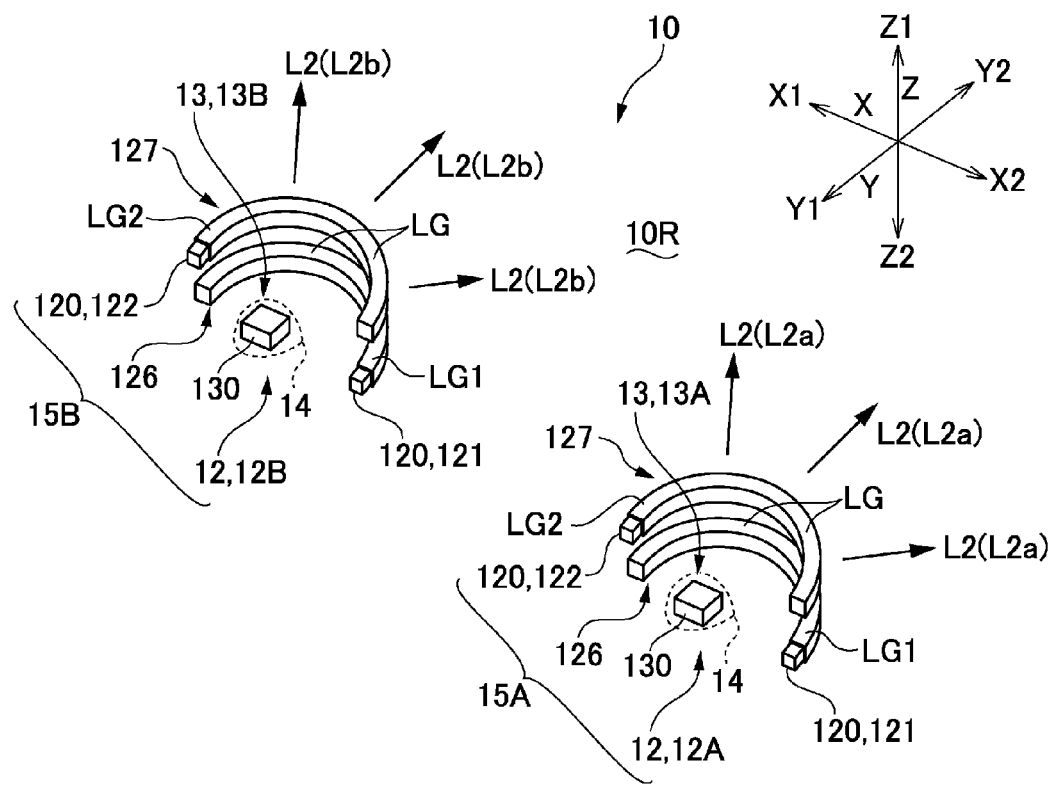
FIG. 3 is an explanatory view showing the configuration of sections of the light emission and reception unit shown in FIG. 2.
Figure 4A:
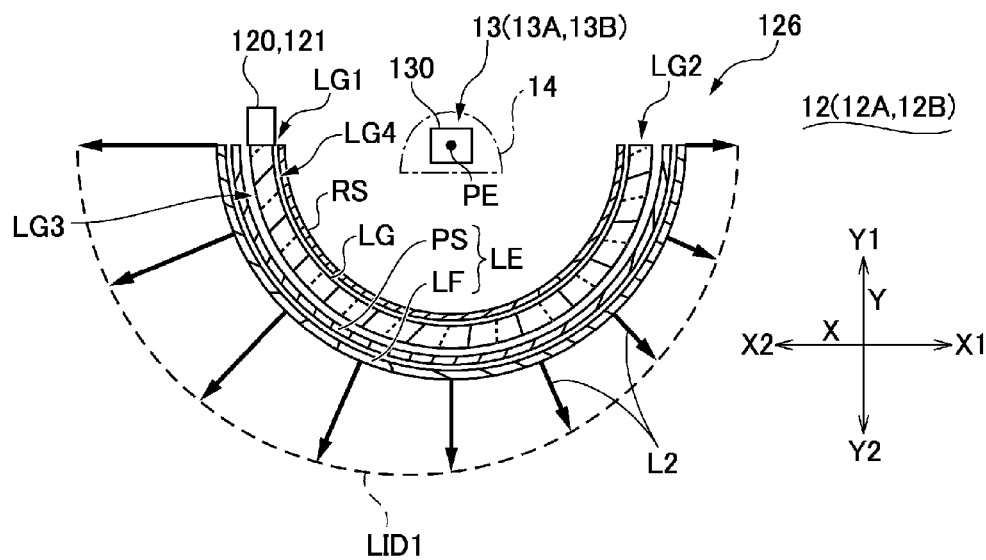
FIGS. 4A and 4B are explanatory views schematically showing the configuration of a light source section provided in the light emission and reception unit shown in FIG. 3.
Figure 4B:
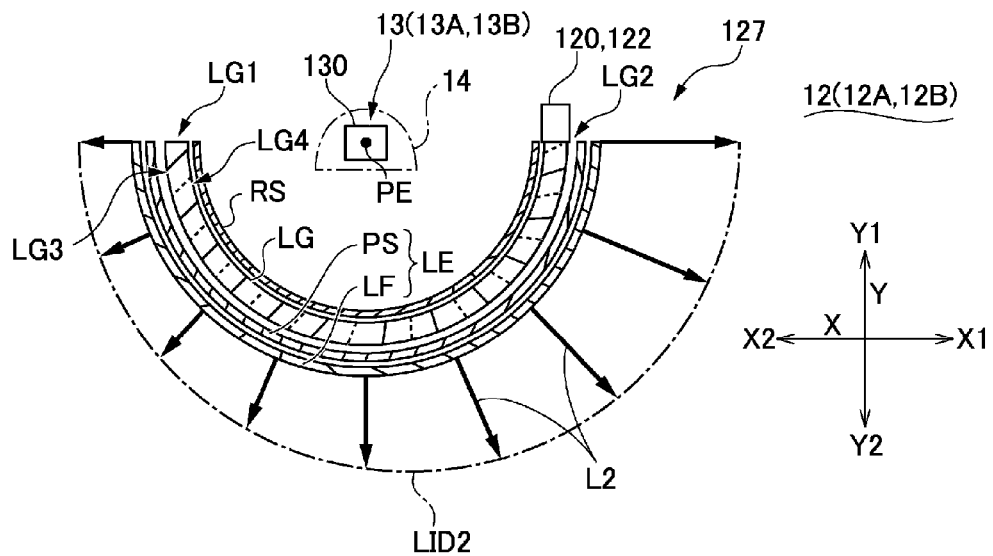

FIG. 2 is an explanatory view of a light emission and reception unit of the optical position detection device 10 according to the first embodiment of the invention. FIG. 3 is an explanatory view showing the configuration of sections of the light emission and reception unit shown in FIG. 2. FIGS. 4A and 4B are explanatory views schematically showing the configuration of the light source section 12 provided in the light emission and reception unit shown in FIG. 3. FIG. 4A is an explanatory view showing a state where the detection light L2 is emitted at the time of a first lighting operation in a first period, and FIG. 4B is an explanatory view showing a state where the detection light L2 is emitted at the time of a second lighting operation in a second period. In addition, a shield member is not shown in FIG. 2.

As shown in FIG. 2, in the optical position detection device 10 according to the present embodiment, the first and second light emission and reception units 15A and 15B have the same configuration. Accordingly, the first and second light source sections 12A and 12B also have the same configuration. More specifically, the first light emission and reception unit 15A has a light source support member 150 with a fan shape or a semicircular shape when viewed from the Z-axis direction. This light source support member 150 has a structure in which first and second light source support members 151 and 152 overlap each other in the Z-axis direction. The first and second light source support members 151 and 152 have fan-shaped or semicircular flanges 156a and 156b, respectively. A portion interposed between the flanges 156a and 156b is a light emitting section which emits the detection light L2 from the first light source section 12A, and the flanges 156a and 156b limit the emission range of the detection light L2 in the Z-axis direction.

In the first light emission and reception unit 15A, the first light source section 12A includes first and second light source modules 126 and 127, which are disposed so as to overlap each other in the Z-axis direction, as an emission section of the detection light L2. In the first light source section 12A, a portion interposed between the first and second light source modules 126 and 127 in the Z-axis direction is a transmissive light guide section 128, and the light receiving element 130 of the first light receiving section 13A is disposed at the back of the light guide section 128. Since the second light emission and reception unit 15B also has the same configuration as the first light emission and reception unit 15A, explanation thereof will be omitted.

As shown in FIG. 3, in the first light emission and reception unit 15A, each of the first and second light source modules 126 and 127 includes a light source 120 formed by a light emitting element, such as a light emitting diode, and an arc-shaped light guide LG. Also in the second light emission and reception unit 15B, each of the first and second light source modules 126 and 127 includes a light source 120 formed by a light emitting element, such as a light emitting diode, and an arc-shaped light guide LG, similar to the first light emission and reception unit 15A.

As shown in FIGS. 4A and 4B, the first light source module 126 includes as the light source 120 a first light source 121 formed by a light emitting element, such as a light emitting diode which emits infrared light, and also includes the arc-shaped light guide LG. The first light source 121 is disposed at one end LG1 of the light guide LG. In addition, the first light source module 126 includes an arc-shaped emission direction setting section LE, which has an optical sheet PS, a louver film LF, and the like, along an arc-shaped outer peripheral surface LG3 of the light guide LG and also includes an arc-shaped reflection sheet RS along an arc-shaped inner peripheral surface LG4 of the light guide LG. Similar to the first light source module 126, the second light source module 127 includes as the light source 120 a second light source 122 formed by a light emitting element, such as a light emitting diode which emits infrared light, and also includes the arc-shaped light guide LG. The second light source 122 is disposed at the other end LG2 of the light guide LG. In addition, similar to the first light source module 126, the second light source module 127 includes an arc-shaped emission direction setting section LE, which has an optical sheet PS, a louver film LF, and the like, along the arc-shaped outer peripheral surface LG3 of the light guide LG and also includes an arc-shaped reflection sheet RS along the arc-shaped inner peripheral surface LG4 of the light guide LG. In addition, machining for adjusting the emission efficiency of the detection light L2 from the light guide LG is performed on at least one of the outer peripheral surface LG3 and the inner peripheral surface LG4 of the light guide LG. As the machining method, it is possible to adopt a method of printing a reflection dot, a molding method of forming the irregularities using a stamper or by injection, or a groove machining method, for example. Since the second light emission and reception unit 15B also has the same configuration as the first light emission and reception unit 15A, explanation thereof will be omitted.

Configuration of a Position Detecting Section and the Like

Figure 5A:
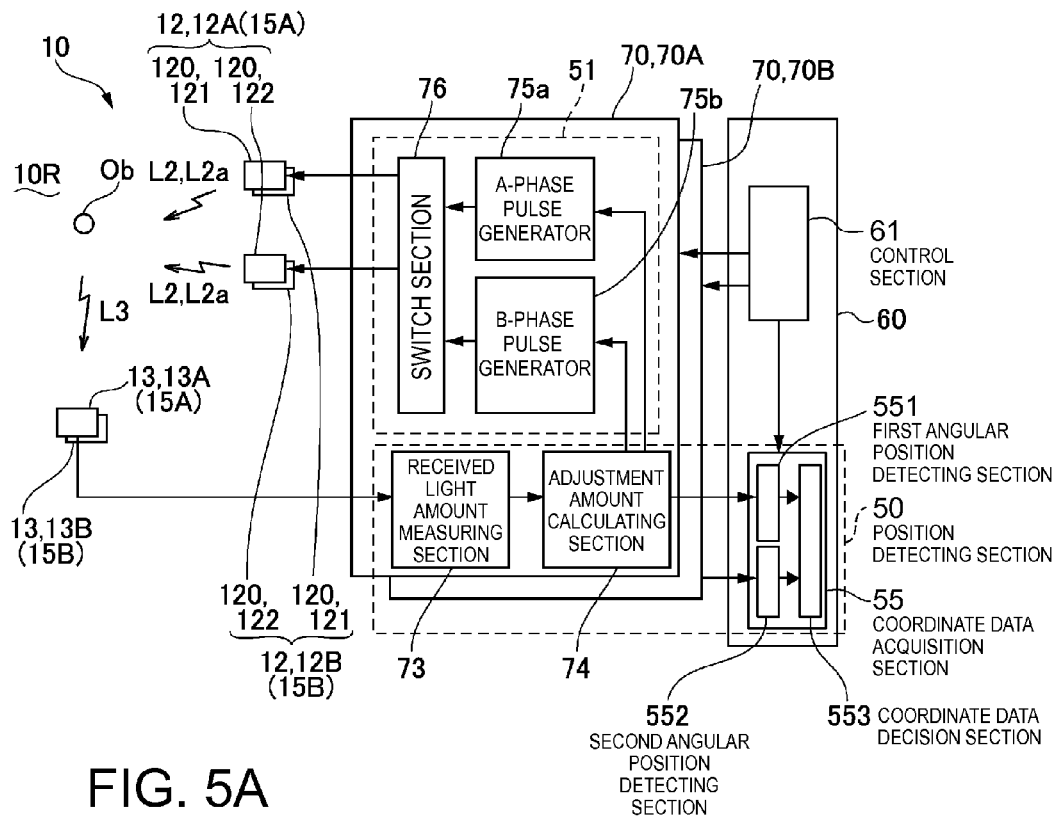
FIGS. 5A and 5B are explanatory views showing the electrical configuration of the optical position detection device according to the first embodiment of the invention.
Figure 5B:
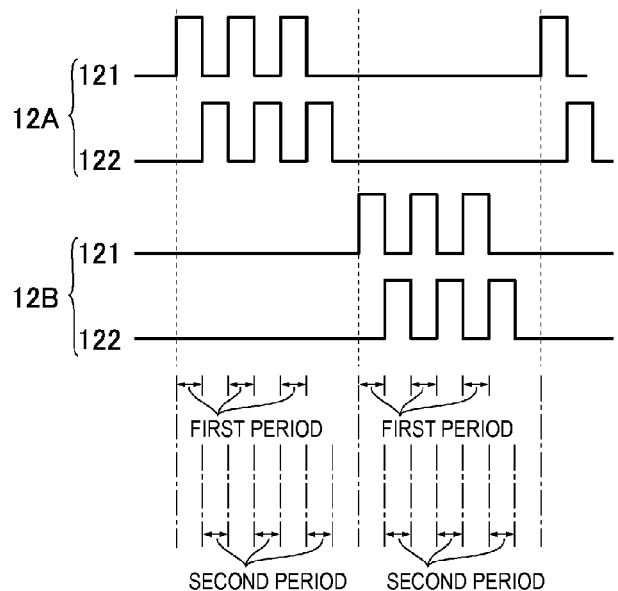

FIGS. 5A and 5B are explanatory views showing the electrical configuration of the optical position detection device 10 according to the first embodiment of the invention. FIG. 5A is an explanatory view showing the configuration of a control IC, and FIG. 5B is an explanatory view of a driving signal supplied to a light source.

In the optical position detection device 10 used in the position detection system 1 of the present embodiment, the first and second light emission and reception units 15A and 15B described with reference to FIGS. 1A to 4B are electrically connected to a control IC 70 shown in FIG. 5A. Here, the control IC 70 includes a first control IC 70A electrically connected to the first light emission and reception unit 15A and a second control IC 70B electrically connected to the second light emission and reception unit 15B, and the first light source section 12A and the first light receiving section 13A of the first light emission and reception unit 15A are electrically connected to the first control IC 70A. In addition, the second light source section 12B and the second light receiving section 13B of the second light emission and reception unit 15B are electrically connected to the second control IC 70B.

The first and second control ICs 70A and 70B have the same configuration, and both the first and second control ICs 70A and 70B are electrically connected to a common control device 60. First, the first control IC 70A includes a plurality of circuits (not shown) which generate a reference clock, an A-phase reference pulse, a B-phase reference pulse, a timing control pulse, a synchronous clock, and the like. In addition, the first control IC 70A includes a pulse generator 75a which generates a predetermined driving pulse on the basis of an A-phase reference pulse, a pulse generator 75b which generates a predetermined driving pulse on the basis of a B-phase reference pulse, and a switch section 76 which controls which of the first and second light sources 121 and 122 of the first light source section 12A receives the driving pulses generated by the pulse generators 75a and 75b. The pulse generators 75a and 75b and the switch section 76 form a light source driving unit 51.

In addition, the first control IC 70A includes a received light amount measuring section 73, which includes an amplifier that amplifies a detection result of the first light receiving section 13A, and an adjustment amount calculating section 74, which adjusts the driving current value (first driving current value) of a driving pulse supplied to the light source 120 (first and second light sources 121 and 122) of the first light source section 12A by controlling the pulse generators 75a and 75b on the basis of a measurement result of the received light amount measuring section 73. The received light amount measuring section 73 and the adjustment amount calculating section 74 have some functions of the position detecting section 50. In addition, the adjustment amount calculating section 74 includes an analog-to-digital conversion section which outputs control signals for the pulse generators 75a and 75b.

Similar to the first control IC 70A, the second control IC 70B includes a received light amount measuring section 73 which includes an amplifier that amplifies a detection result of the second light receiving section 13B, an adjustment amount calculating section 74 which adjusts the value of a second driving current supplied to the light source 120 (first and second light sources 121 and 122) of the second light source section 12B by controlling the pulse generators 75a and 75b on the basis of a measurement result of the received light amount measuring section 73, and the like. The received light amount measuring section 73 and the adjustment amount calculating section 74 have some functions of the position detecting section 50.

The first and second control ICs 70A and 70B are controlled by a control section 61 of the high-order control device 60, such as a personal computer. The control device 60 has a coordinate data acquisition section 55 which forms the position detecting section 50 together with the received light amount measuring section 73 and the adjustment amount calculating section 74. In the present embodiment, therefore, the position detecting section 50 is formed by the received light amount measuring section 73 and the adjustment amount calculating section 74 of the control IC 70 (first and second control ICs 70A and 70B) and the coordinate data acquisition section 55 of the high-order control device 60 (personal computer).

In the present embodiment, the first and second light source sections 12A and 12B disposed at separate positions are provided as the light source section 12. Accordingly, the coordinate data acquisition section 55 includes a first angular position detecting section 551, which detects the angular position of the target object Ob with respect to the radiation center of the first light source section 12A on the basis of a driving result of the first light source section 12A, and a second angular position detecting section 552, which detects the angular position of the target object Ob with respect to the radiation center of the second light source section 12B on the basis of a driving result of the second light source section 12B. In addition, the coordinate data acquisition section 55 includes a coordinate data decision section 553 which determines the XY coordinate data of the target object Ob on the basis of the angular position of the target object Ob obtained by the first angular position detecting section 551 and the angular position of the target object Ob obtained by the second angular position detecting section 552.

In addition, although the two control ICs 70 (first and second control ICs 70A and 70B) are used in one-to-one correspondence for the first and second light emission and reception units 15A and 15B in the present embodiment, the control IC 70 may have multiple channels so that the first and second light emission and reception units 15A and 15B are driven by one control IC 70.

In the optical position detection device 10 configured in this way, the light source driving unit 51 of the first control IC 70A applies a driving pulse to the first light source 121 of the first light source section 12A in the first period (at the time of first lighting operation) and applies a driving pulse, which has an opposite phase to the driving pulse applied to the first light source 121, to the second light source 122 of the first light source section 12A in the second period (at the time of second lighting operation), as shown in FIG. 5B. Then, the light source driving unit 51 of the second control IC 70B applies a driving pulse to the first light source 121 of the second light source section 12B in the first period (at the time of first lighting operation) and also applies a driving pulse, which has an opposite phase to the driving pulse applied to the first light source 121, to the second light source 122 of the second light source section 12B in the second period (at the time of second lighting operation). In addition, in the optical position detection device 10, voltage amplitude modulation or pulse width modulation is performed when controlling the driving current value for the light source section 12.

Coordinate Detection Principle

As shown in FIGS. 4A and 4B, in the optical position detection device 10 according to the present embodiment, the light source driving unit 51 described with reference to FIG. 5A makes both the light source section 12 (first and second light source sections 12A and 12B) perform a first lighting operation (first period) in which the emission intensity of the detection light L2 decreases from one side toward the other side of the radiation angle range of the detection light L2 and a second lighting operation (second period) in which the emission intensity of the detection light L2 decreases from the other side toward the one side of the radiation angle range of the detection light L2.

More specifically, the light source driving unit 51 makes the first light source section 12A turn on the first light source 121 of the first light source module 126 at the time of the first lighting operation (first period) so that the detection light L2 is emitted to the space to be detected 10R. In this case, the second light source 122 is turned off. As a result, the first light intensity distribution LID1 is formed in the space to be detected 10R. The first light intensity distribution LID1 is an intensity distribution in which the intensity decreases monotonically from the angular direction corresponding to the one end LG1 toward the angular direction corresponding to the other end LG2, as shown by arrows in FIG. 4A whose lengths indicate the intensities of emitted light.

In addition, the light source driving unit 51 makes the first light source section 12A turn on the second light source 122 of the second light source module 127 at the time of the second lighting operation (second period) so that the detection light L2 is emitted to the space to be detected 10R. In this case, the first light source 121 is turned off. As a result, the second light intensity distribution LID2 is formed in the space to be detected 10R. The second light intensity distribution LID2 is an intensity distribution in which the intensity decreases monotonically from the angular direction corresponding to the other end LG2 toward the angular direction corresponding to the one end LG1, as shown by arrows in FIG. 4B whose lengths indicate the intensities of emitted light.

Moreover, in both the first lighting operation of the second light source section 12B in which the first light source 121 of the first light source module 126 is turned on and the second lighting operation of the second light source section 12B in which the second light source 122 of the second light source module 127 is turned on, the first light intensity distribution LID1 and the second light intensity distribution LID2 are formed, in the same manner as in the first light source section 12A. Therefore, if the first light intensity distribution LID1 and the second light intensity distribution LID2 are used, the position of the target object Ob can be detected since a distance DS (refer to FIG. 7) between the center PE of the first light source section 12A and the center PE of the second light source section 12B is fixed. This will be described later.

Detection of the Angular Position of the Target Object Ob

Figure 6A:
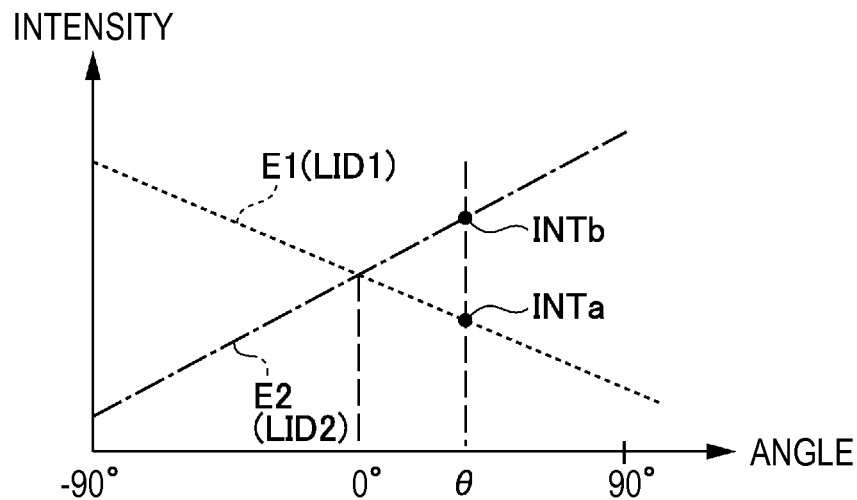
FIGS. 6A and 6B are explanatory views showing the position detection principle in the optical position detection device according to the first embodiment of the invention.
Figure 6B:
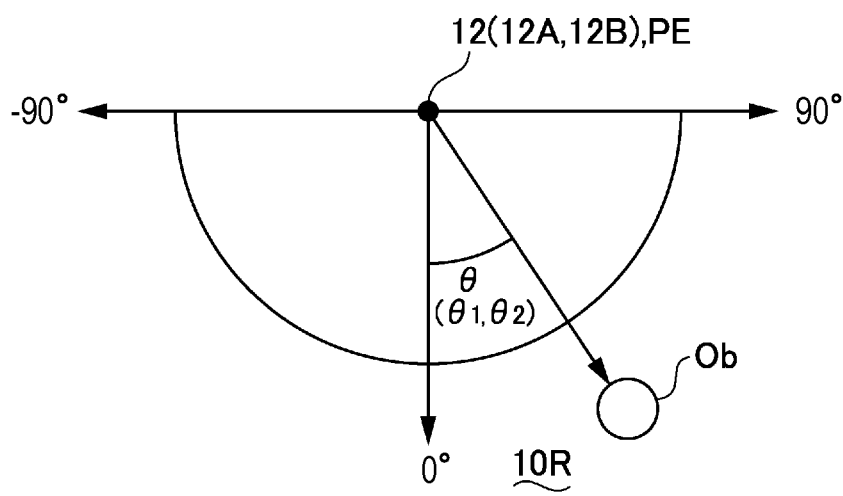
Figure 7:
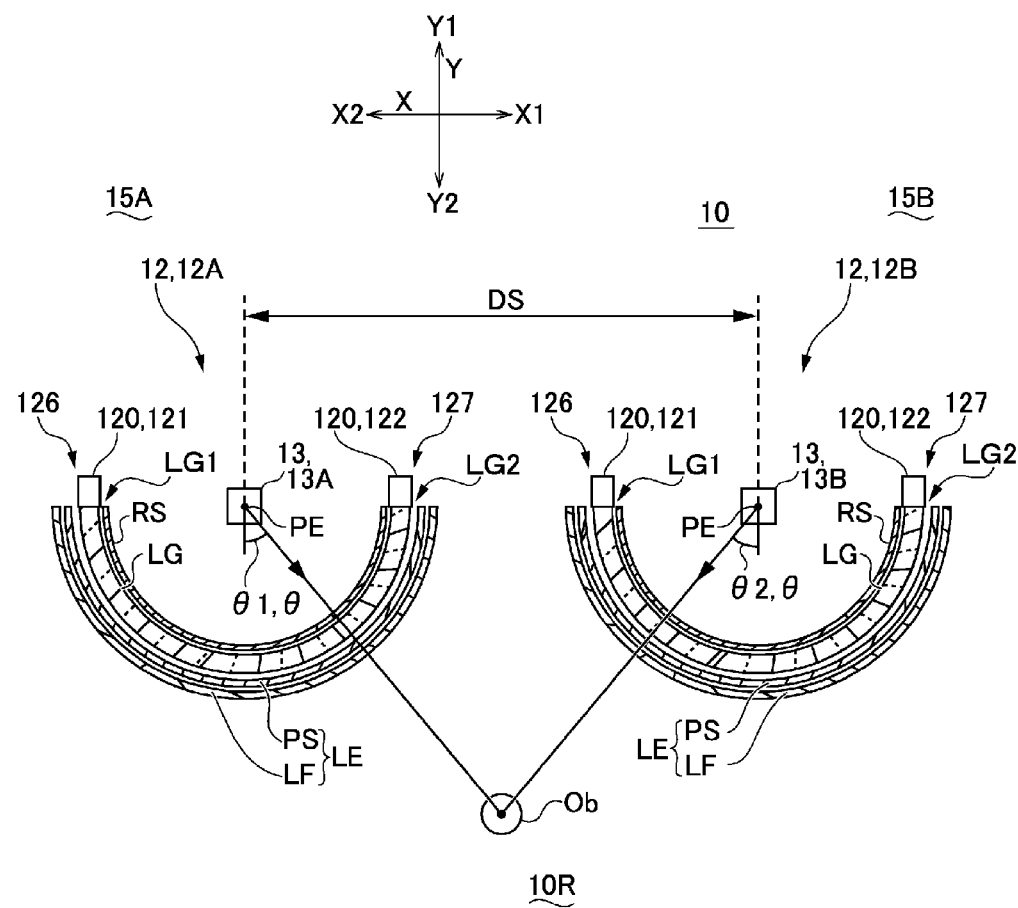
FIG. 7 is an explanatory view showing the principle of acquiring the XY coordinate data of a target object in the optical position detection device according to the first embodiment of the invention.

FIGS. 6A and 6B are explanatory views showing the position detection principle in the optical position detection device 10 according to the first embodiment of the invention. FIG. 6A is an explanatory view of the light intensity distribution, and FIG. 6B is an explanatory view of a method of acquiring the position information (azimuth information) regarding the position where a target object is present. FIG. 7 is an explanatory view showing the principle of acquiring the XY coordinate data of the target object Ob in the optical position detection device 10 according to the first embodiment of the invention.

First, when the first light intensity distribution LID1 is formed by the first light source module 126 of the first light source section 12A, the emission direction of the detection light L2 and the intensity of the detection light L2 are in the linear relationship shown by the line E1 in FIG. 6A. In addition, when the second light intensity distribution LID2 is formed by the second light source module 127 of the first light source section 12A, the emission direction of the detection light L2 and the intensity of the detection light L2 are in the linear relationship shown by the line E2 in FIG. 6A. Here, as shown in FIGS. 6B and 7, it is assumed that the target object Ob is present in a direction of an angle θ when viewed from the center PE of the first light source section 12A (center of the first light source module 126/radiation center of the detection light L2). In this case, when the first light intensity distribution LID1 is formed, the intensity of the detection light L2 at the position where the target object Ob is present becomes INTa. On the other hand, when the second light intensity distribution LID2 is formed, the intensity of the detection light L2 at the position where the target object Ob is present becomes INTb. Accordingly, if the relationship between the intensities INTa and INTb is obtained by comparing the detected intensity in the first light receiving section 13A when the first light intensity distribution LID1 is formed with the detected intensity in the second light receiving section 13B when the second light intensity distribution LID2 is formed, it is possible to calculate the angle θ (angle θ1/angular position) in a direction, in which the target object Ob is located, with the center PE of the first light source section 12A as a reference, as shown in FIGS. 6B and 7.

In the present embodiment, when detecting the angular position (angle θ1) of the target object Ob using such a principle, the first driving current value for the first light source 121 and the second driving current value for the second light source 122 are adjusted such that the detected intensity in the first light receiving section 13A when the first light intensity distribution LID1 is formed by the first light source module 126 in the first light source section 12A becomes equal to the detected intensity in the first light receiving section 13A when the second light intensity distribution LID2 is formed by the second light source module 127. Here, the emission intensity of the detection light L2 emitted from the first light source section 12A is proportional to the first driving current value for the first light source 121 and the second driving current value for the second light source 122. Therefore, the angle θ (angle θ1) in a direction in which the target object Ob is located can be calculated from the ratio or the difference between the first and second driving current values after adjusting the first driving current value for the first light source 121 and the second driving current value for the second light source 122 or from the ratio or the difference between the adjustment amounts when the driving current values are adjusted.

More specifically, first, the light source driving unit 51 of the first control IC 70A shown in FIG. 5A forms the first light intensity distribution LID1 by turning on the first light source 121 as the first lighting operation and then forms the second light intensity distribution LID2 by turning on the second light source 122 as the second lighting operation. In this case, intensity change directions of the first light intensity distribution LID1 and the second light intensity distribution LID2 are opposite directions, but the intensity levels of the first light intensity distribution LID1 and the second light intensity distribution LID2 are the same. Then, the adjustment amount calculating section 74 of the position detecting section 50 shown in FIG. 5A compares the received light intensity INTa of the first light receiving section 13A at the time of the first lighting operation with the received light intensity INTb of the first light receiving section 13A at the time of the second lighting operation. As a result, if the received light intensity INTa of the first light receiving section 13A at the time of the first lighting operation is equal to the received light intensity INTb of the first light receiving section 13A at the time of the second lighting operation, the angular position of the target object Ob is 0°.

On the other hand, when the received light intensities INTa and INTb are different, the first driving current value for the first light source 121 and the second driving current value for the second light source 122 are adjusted such that the received light intensity INTa of the first light receiving section 13A at the time of the first lighting operation becomes equal to the received light intensity INTb of the first light receiving section 13A at the time of the second lighting operation. Then, if the received light intensity INTa of the first light receiving section 13A at the time of the first lighting operation and the received light intensity INTb of the first light receiving section 13A at the time of the second lighting operation are equal when the first and second lighting operations are performed again, the first angular position detecting section 551 shown in FIG. 5A can calculate the angle θ (angle θ1) in a direction in which the target object Ob is located from the ratio or the difference between the driving currents for the first and second light sources 121 and 122 after performing such adjustment or from the ratio or the difference between the adjustment amounts of the driving currents.

If this operation is also performed in the second light source section 12B, the second angular position detecting section 552 shown in FIG. 5A can calculate the angle θ (angle θ2/angular position) in a direction in which the target object Ob is located with the center PE of the second light source section 12B as a reference. Therefore, the coordinate data decision section 553 shown in FIG. 5A can acquire, as data of the XY coordinates at which the target object Ob is located, a position equivalent to the point of intersection between the angular position (direction of the angle θ1) detected by the first angular position detecting section 551 and the angular position (direction of the angle θ2) detected by the second angular position detecting section 552.

Configuration of the Light Receiving Section 13 (Light Receiving Unit)

Figure 8A:
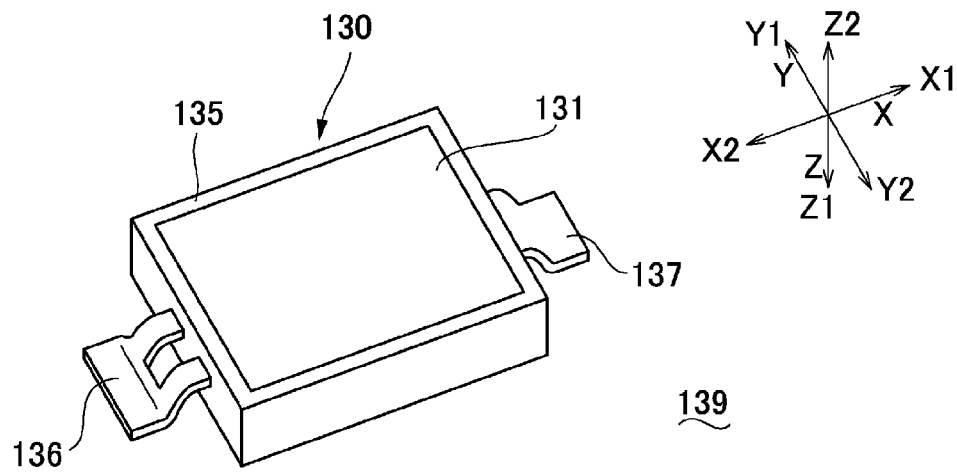
FIGS. 8A and 8B are explanatory views of a light receiving element used in a light receiving section (light receiving unit) of the optical position detection device according to the first embodiment of the invention.
Figure 8B:
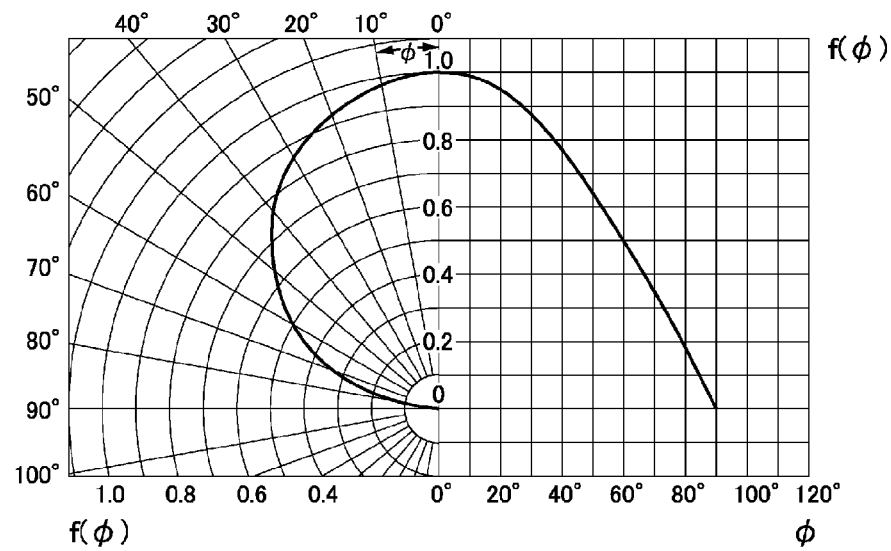
Figure 9:
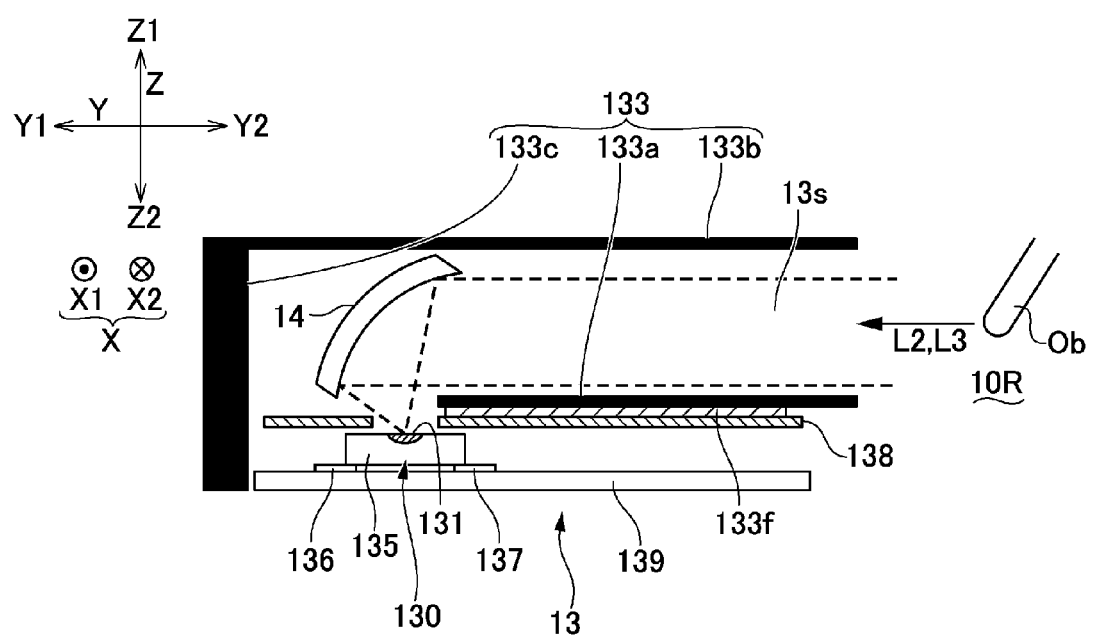
FIG. 9 is a YZ sectional view of the light receiving section (light receiving unit) of the optical position detection device according to the first embodiment of the invention.
Figure 10A:
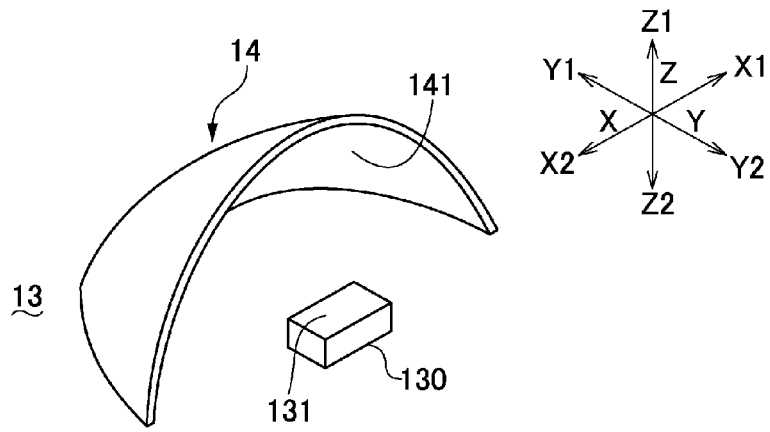
FIGS. 10A to 10C are explanatory views of a light receiving element and a concave mirror used in the light receiving section (light receiving unit) of the optical position detection device according to the first embodiment of the invention.
Figure 10B:
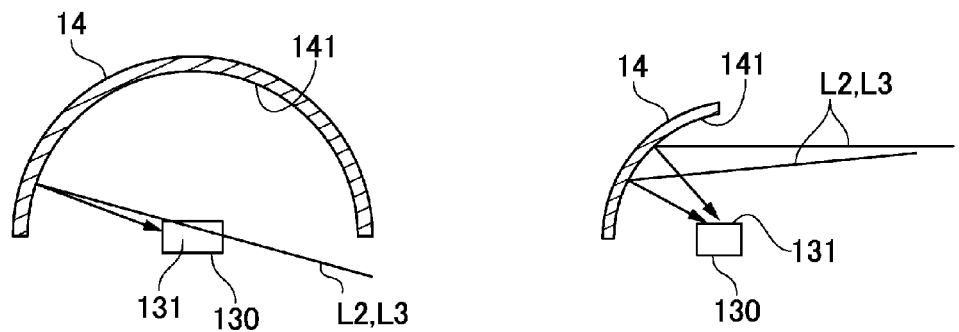
Figure 10B:
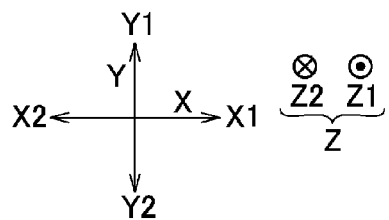
Figure 10C:
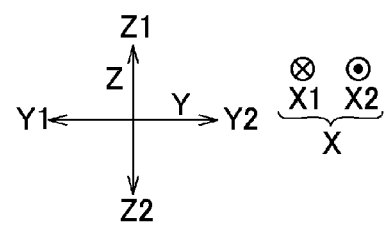

FIGS. 8A and 8B are explanatory views of the light receiving element 130 used in the light receiving section 13 (light receiving unit) of the optical position detection device 10 according to the first embodiment of the invention. FIG. 8A is an explanatory view of the light receiving element 130, and FIG. 8B is a graph showing the sensitivity directivity of the light receiving element 130. FIG. 9 is a YZ sectional view of the light receiving section 13 (light receiving unit) of the optical position detection device 10 according to the first embodiment of the invention. FIGS. 10A to 10C are explanatory views of the light receiving element 130 and the concave mirror 14 used in the light receiving section 13 (light receiving unit) of the optical position detection device 10 according to the first embodiment of the invention. FIGS. 10A to 10C are a perspective view, an XY sectional view, and a YZ sectional view showing the positional relationship between the light receiving section 13 and the concave mirror 14, respectively. In addition, in the optical position detection device 10 according to the present embodiment, the first light receiving section 13A provided in the first light emission and reception unit 15A and the second light receiving section 13B provided in the second light emission and reception unit 15B have the same configuration. Accordingly, the configuration of the first and second light receiving sections 13A and 13B will be described through the light receiving section 13 which is a collective expression of the first and second light receiving sections 13A and 13B.

In the optical position detection device 10 according to the present embodiment, the light receiving section 13 includes the light receiving element 130 shown in FIG. 8A and the concave mirror 14 to be described later with reference to FIGS. 9 to 10C. The light receiving element 130 includes an element body 135 having a rectangular parallelepiped shape as a whole and terminals 136 and 137 protruding from both end surfaces of the element body 135 in the X-axis direction. The element body 135 has a light receiving surface 131 on its one surface side. The light receiving sensitivity of the light receiving element 130 (photodiode) has incidence angle dependency (sensitivity directivity) shown in FIG. 8B, and has a peak sensitivity direction in a direction normal to the light receiving surface 131. In addition, when the incidence angle of the detection light L2 is inclined by 60° or more from a direction normal to the light receiving surface 131, the light receiving element 130 has a sensitivity less than ½ of the peak sensitivity value. Accordingly, the sensitivity is significantly low.

Moreover, in the position detection system 1, it is preferable that the detection region of the optical position detection device 10 be large in the in-plane direction of the XY plane along the viewing surface 41 shown in FIGS. 1A and 1B. On the other hand, in the position detection system 1, when the XY coordinate position of the target object Ob with respect to the viewing surface 41 is used as input information, it is preferable that the detection range be narrow in the Z-axis direction of the optical position detection device 10.

Therefore, in the present embodiment, as shown in FIG. 9, the light receiving element 130 of the light receiving section 13 is mounted on a wiring substrate 139 in a state where the light receiving surface 131 faces the one side Z1 of the Z-axis direction although the detection light L2 (reflected light L3) reflected from the target object Ob is incident along the XY plane. In addition, the light receiving section 13 includes the concave mirror 14, which has a reflective surface 141 facing the light receiving surface 131, provided at the one side Z1 of the Z-axis direction and the one side Y1 of the Y-axis direction with respect to the light receiving surface 131. When the detection light L2 (reflected light L3) reflected from the target object Ob is incident along the XY plane, the concave mirror 14 reflects the reflected light L3 toward the light receiving section 13. In addition, the light receiving section 13 includes a shield plate 138 facing the wiring substrate 139 at the one side Z1 of the Z-axis direction. The shield plate 138 is formed of a metal plate, such as iron or aluminum. In addition, the light receiving section 13 includes a case 133, which holds the concave mirror 14 inside and also holds the shield plate 138 or the wiring substrate 139 using an adhesive layer 133f or the like. With the case 133, the light receiving section 13 is formed as a light receiving unit.

Here, the case 133 includes a light shielding plate portion 133a disposed at the one side Z1 of the Z-axis direction with respect to the shield plate 138, a light shielding plate portion 133b facing the light shielding plate portion 133a at the one side Z1 of the Z-axis direction, and a connecting plate portion 133c which is provided at one side of the Y-axis direction with respect to the concave mirror 14 in order to connect the light shielding plate portions 133a and 133b. Therefore, in the case 133, a space interposed between the light shielding plate portions 133a and 133b forms an optical path 13s which guides the reflected light L3 reflected in the space to be detected 10R to the concave mirror 14, and the light shielding plate portions 133a and 133b limit a range of the reflected light L3 in the Z-axis direction which is incident on the concave mirror 14. However, the case 133 does not limit a range of light incident on the concave mirror 14 in the XY plane direction.

In the present embodiment, the concave mirror 14 has the curved reflective surface 141, as shown in FIGS. 10A to 10C. In the present embodiment, the first cross section (XY cross section) of the reflective surface 141 when the concave mirror 14 is cut by the XY plane is an arc, and the second cross section (YZ cross section) of the reflective surface 141 perpendicular to the first cross section is a quadratic curve. Here, the light receiving element 130 has the light receiving surface 131 facing the one side Z1 of the Z-axis direction at the circle center of the arc-shaped reflective surface 141 when seen from the Z-axis direction. In addition, the light receiving element 130 has the light receiving surface 131 facing the one side Z1 of the Z-axis direction at the center of the reflective surface 141 with a quadratic curve shape when seen from the X-axis direction. In the present embodiment, the second cross section (YZ cross section) of the reflective surface 141 when the concave mirror 14 is cut by the YZ plane is an arc, and the light receiving element 130 has the light receiving surface 131 facing the one side Z1 of the Z-axis direction at the circle center of the reflective surface 141 when seen from the X-axis direction. Accordingly, the reflected light L3 reflected in the space to be detected 10R reaches the concave mirror 14 through the optical path 13s and is then reflected by the reflective surface 141 to the light receiving surface 131 of the light receiving element 130.

In the reflective surface 141, the radius of curvature of an arc (second cross section) when the concave mirror 14 is cut by the YZ plane at the position where the radius of curvature is largest is smaller than the radius of curvature of an arc (first cross section) when the concave mirror 14 is cut by the XY plane at the position where the radius of curvature is largest. In the light receiving section 13, therefore, in the in-plane direction of the XY plane along the first cross section, even light incident from the oblique direction is reflected by the concave mirror 14 to the light receiving surface 131 of the light receiving element 130. On the other hand, in the in-plane direction of the YZ plane along the second cross section, the incidence angle of light reaching the light receiving element 130 is limited by the concave mirror 14. Accordingly, the detectable angle range is narrow.

Main Effects of the Present Embodiment

As described above, in the optical position detection device 10 according to the present embodiment, the light source section 12 radially emits the detection light L2 and also forms the light intensity distribution (first light intensity distribution LID1 and second light intensity distribution LID2) in which the intensity changes from one side toward the other in the radiation angle range of the detection light L2, and the light receiving section 13 receives the detection light L2 reflected from the target object Ob located in the space to be detected 10R in which the light intensity distribution is formed. Here, since the intensity of the detection light L2 reflected from the target object Ob is proportional to the intensity in a place where the target object Ob is located in the light intensity distribution, the received light intensity in the light receiving section 13 corresponds to the position of the target object Ob. Therefore, the position detecting section 50 can detect the position of the target object Ob on the basis of the received light intensity in the light receiving section 13. According to this method, since the light intensity distribution of the detection light L2 radially emitted from the light source section 12 is used, the light intensity distribution can be formed over the wide space. That is, the space to be detected 10R is wide.

In addition, the light receiving section 13 includes the light receiving element 130 and the concave mirror 14. The first cross section (XY cross section) of the reflective surface 141 of the concave mirror 14 is an arc, and the second cross section (YZ cross section) perpendicular to the first cross section (XY cross section) is a quadratic curve. For this reason, in the in-plane direction of the XY plane along the first cross section, even light incident from the oblique direction with respect to the light receiving section 13 is reflected by the concave mirror 14 to the light receiving element 130. Therefore, in the in-plane direction of the XY plane along the first cross section, the detectable angle range is wide. On the other hand, in the in-plane direction of the YZ plane along the second cross section, the detectable angle range is narrow since the incidence angle of light reaching the light receiving element 130 is limited by the concave mirror 14 even if the reflected light L3 reaches the light receiving section 13. That is, among the reflected light beams L3 passing through the optical path 13s, light traveling in a direction which is largely inclined from the central axis of the reflective surface 141 cannot reach the reflective surface 141 of the concave mirror 14 and accordingly, does not reach the light receiving element 130. Therefore, within the range limited in the Z-axis direction, the position (XY coordinate data) of the target object Ob can be detected over a wide range in the in-plane direction of the XY plane crossing the Z-axis direction.

In addition, both the first cross section (XY cross section) and the second cross section (YZ cross section) in the concave mirror 14 are arcs, but the radius of curvature of the arc (second cross section) when the concave mirror 14 is cut by the YZ plane at the position where the radius of curvature is largest is smaller than the radius of curvature of the arc (first cross section) when the concave mirror 14 is cut by the XY plane at the position where the radius of curvature is largest. In the light receiving section 13, therefore, in the in-plane direction of the XY plane along the first cross section, even light incident from the oblique direction is reflected by the concave mirror 14 to the light receiving surface 131 of the light receiving element 130 reliably. On the other hand, in the in-plane direction of the YZ plane along the second cross section, the detectable angle range is narrow since a range in which the light can reach the concave mirror 14 is narrow. Therefore, in the present embodiment, the position (XY coordinate data) of the target object Ob can be detected within the range which is more limited in the Z-axis direction.

In addition, since the light receiving element 130 is disposed at the center of the quadratic curve which is the second cross section (YZ cross section) of the reflective surface 141, the concave mirror 14 reflects efficiently the reflected light L2, which reaches the reflective surface 141, toward the light receiving surface 131 of the light receiving element 130. Accordingly, the received light intensity of the light receiving section 13 is high.

Moreover, in the present embodiment, the reflected light L3 traveling within the XY plane is reflected in the Z-axis direction by the concave mirror 14 to the light receiving element 130. In this case, the angle range when the reflected light L3 is incident on the light receiving surface 131 of the light receiving element 130 is narrower than the angle range when the reflected light L3 travels within the XY plane due to the reflection on the concave mirror 14. Accordingly, since the angle range when the reflected light L3 is incident on the light receiving surface 131 becomes a narrow range with a direction normal to the light receiving surface 131 as the center, the received light intensity in the light receiving element 130 is large even if the light receiving element 130 has the sensitivity directivity shown in FIG. 8B. Therefore, the optical position detection device 10 according to the present embodiment can detect the position of the target object Ob with high sensitivity over a wide range within the XY plane.

In addition, in the optical position detection device 10 according to the present embodiment, the position detecting section 50 detects the angular position on the basis of a comparison result of the value of the first driving current supplied to the light source section 12 at the time of the first lighting operation and the value of the second driving current supplied to the light source section 12 at the time of the second lighting operation such that the received light intensity in the light receiving section 13 becomes the same at the time of the first and second lighting operations (first and second periods) in the light source section 12. Such a configuration is advantageous in that the influence of outside light or the influence of a sensitivity change and the like in the light receiving section 13 is difficult to receive, compared with a case where the angular position of the target object Ob is directly detected from the received light intensity in the light receiving section 13.

In addition, in the optical position detection device 10 according to the present embodiment, the detection light L2 is invisible since the detection light L2 is infrared light. Therefore, there is an advantage in that the detection light L2 does not interrupt viewing of information even when the information is displayed on the viewing surface 41.

Second Embodiment

Figure 11A:
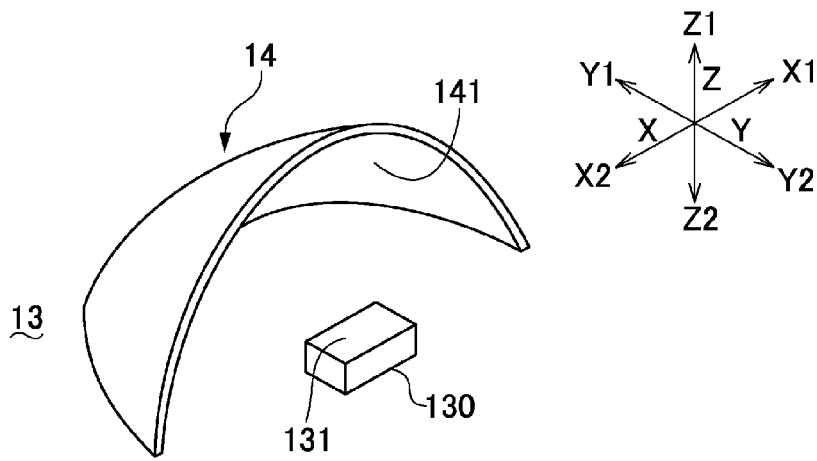
FIGS. 11A to 11C are explanatory views of a light receiving element and a concave mirror used in a light receiving section (light receiving unit) of an optical position detection device according to a second embodiment of the invention.
Figure 11B:
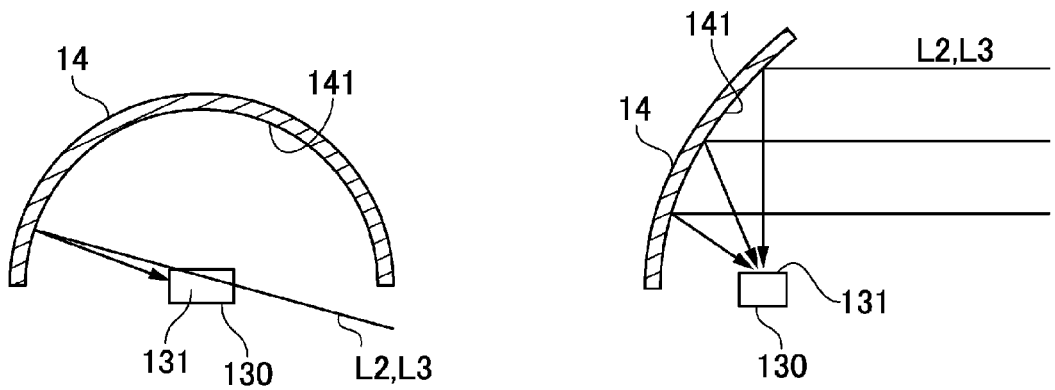
Figure 11B:
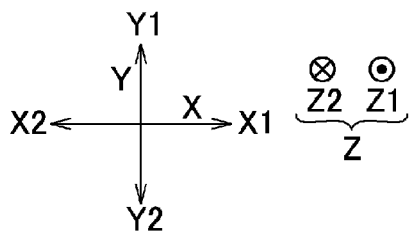
Figure 11C:
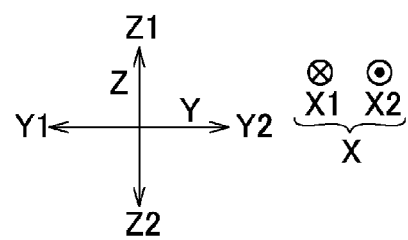

FIGS. 11A to 11C are explanatory views of the light receiving element 130 and the concave mirror 14 used in the light receiving section 13 (light receiving unit) of the optical position detection device 10 according to the second embodiment of the invention. FIGS. 11A to 11C are a perspective view, an XY sectional view, and a YZ sectional view showing the positional relationship between the light receiving section 13 and the concave mirror 14, respectively. In addition, since the basic configuration in the present embodiment is the same as that in the first embodiment, the same components are denoted by the same reference numerals, and a duplicate explanation thereof will be omitted.

As shown in FIGS. 11A to 11C, in the optical position detection device 10 according to the present embodiment, the light receiving section 13 includes the light receiving element 130 and the concave mirror 14 as in the first embodiment. Moreover, in the present embodiment, the first cross section (XY cross section) of the reflective surface 141 in the concave mirror 14 when the concave mirror 14 is cut by the XY plane is an arc and the second cross section (YZ cross section) of the reflective surface 141 perpendicular to the first cross section is a quadratic curve, similar to the first embodiment. In addition, the light receiving element 130 has a light receiving surface 131 facing the one side Z1 of the Z-axis direction at the circular center of the arc-shaped reflective surface 141 when seen from the Z-axis direction. In addition, the light receiving element 130 has the light receiving surface 131 facing the one side Z1 of the Z-axis direction at the center of the reflective surface 141 with a quadratic curve shape when seen from the X-axis direction.

Here, the second cross section (YZ cross section) of the reflective surface 141 when the concave mirror 14 is cut by the YZ plane is a parabola, and the light receiving element 130 has the light receiving surface 131 facing the one side Z1 of the Z-axis direction at the focal position (center) of this parabola. Since the other configuration is the same as that in the first embodiment, a duplicate explanation thereof will be omitted.

In the optical position detection device 10 configured in this way, in the in-plane direction of the XY plane along the first cross section, even light incident from the oblique direction with respect to the light receiving section 13 is reflected by the concave mirror 14 to the light receiving element 130, similar to the first embodiment. Therefore, in the in-plane direction of the XY plane along the first cross section, the detectable angle range is wide.

On the other hand, in the in-plane direction of the YZ plane along the second cross section, the detectable angle range is narrow since the incidence angle of light reaching the light receiving element 130 is limited by the concave mirror 14 even if the reflected light L3 reaches the light receiving section 13. That is, since the second cross section of the reflective surface 141 is a parabola and the light receiving element 130 is disposed at the focal position, light traveling in a direction inclined from the central axis of the reflective surface 141, among the reflected light beams L3 passing through the optical path 13s, cannot reach the reflective surface 141 of the concave mirror 14 and accordingly does not reach the light receiving element 130. Therefore, the detection range in the Z-axis direction can be made narrower than that in the first embodiment, but the position (XY coordinate data) of the target object Ob can still be detected over a wide range in the in-plane direction of the XY plane.

Third Embodiment

FIGS. 12A to 12C are explanatory views of the light receiving element 130 and the concave mirror 14 used in the light receiving section 13 (light receiving unit) of the optical position detection device 10 according to the third embodiment of the invention. FIGS. 12A to 12C are a perspective view, an XY sectional view, and a YZ sectional view showing the positional relationship between the light receiving section 13 and the concave mirror 14, respectively. In addition, since the basic configuration in the present embodiment is the same as that in the first embodiment, the same components are denoted by the same reference numerals, and a duplicate explanation thereof will be omitted.

As shown in FIGS. 12A to 12C, in the optical position detection device 10 according to the present embodiment, the light receiving section 13 includes the light receiving element 130 and the concave mirror 14 as in the first and second embodiments. In addition, in the present embodiment, the first cross section (XY cross section) of the reflective surface 141 in the concave mirror 14 when the concave mirror 14 is cut by the XY plane is an arc as in the first and second embodiments.

In the present embodiment, the second cross section (YZ cross section) of the reflective surface 141 when the concave mirror 14 is cut by the YZ plane has a shape in which a plurality of linear reflective surfaces 14a to 14e (divided reflective surfaces) are arranged in an array along the normal direction (Z-axis direction) of the first cross section. That is, in the present embodiment, the reflective surface 141 is formed by the plurality of reflective surfaces 14a to 14e which are partial conical surfaces. Here, the plurality of divided reflective surfaces are set as the reflective surfaces 14a, 14b, 14c, 14d, and 14e sequentially with an increasing distance from the position close to the light receiving element 130.

Moreover, as shown in FIG. 12C, the angle formed by the normal line of each of the reflective surfaces 14a to 14e and the first cross section (XY plane) increases as a distance from the light receiving element 130 increases along the normal direction (Z-axis direction) of the first cross section. More specifically, assuming that the angles formed by the reflective surfaces 14a to 14e and the first cross section (XY plane) are θa, θb, θc, θd, and θe, the relationship of θa<θb<θc<θd<θe is satisfied. In addition, the centers of the reflective surfaces 14a to 14e in the Z-axis direction are located on the parabola, and the light receiving surface 131 of the light receiving element 130 faces the one side Z1 of the Z-axis direction at the focal position (center) of the parabola. Since the other configuration is the same as that in the first embodiment, a duplicate explanation thereof will be omitted.

In the optical position detection device 10 configured in this way, in the in-plane direction of the XY plane along the first cross section, even light incident from the oblique direction with respect to the light receiving section 13 is reflected by the concave mirror 14 to the light receiving element 130, similar to the first embodiment. Therefore, in the in-plane direction of the XY plane along the first cross section, the detectable angle range is wide.

On the other hand, in the in-plane direction of the YZ plane along the second cross section, the detectable angle range is narrow since the incidence angle of light reaching the light receiving element 130 is limited by the concave mirror 14 even if the reflected light L3 reaches the light receiving section 13. That is, among the reflected light beams L3 passing through the optical path 13s, light traveling in a direction inclined from the central axis of the reflective surface 141 cannot reach the reflective surface 141 of the concave mirror 14 and accordingly does not reach the light receiving element 130. Therefore, the detection range in the Z-axis direction can be made narrower than that in the first embodiment, but the position (XY coordinate data) of the target object Ob can still be detected over a wide range in the in-plane direction of the XY plane.

In addition, in the present embodiment, the reflective surface 141 of the concave mirror 14 is divided into the plurality of reflective surfaces 14a to 14e which are conical surfaces. Accordingly, when forming the concave mirror 14, it is only necessary to combine a plurality of conical members in the normal direction (Z-axis direction) of the first cross section. Thus, the manufacturing of the concave mirror 14 is easy.

Modifications of the First to Third Embodiments

Although the light source 120 is provided in each of the two light guides LG in the first to third embodiments described above, it is also possible to provide the light source 120 at both ends of one light guide LG and to alternately turn on the light source 120 so that the light intensity distributions with opposite directions in the first and second periods are formed. In this case, if the light receiving section 13 is provided at the radiation center of the light source section 12, the incidence of the detection light L2 on the light receiving section 13 is interrupted by the light source section 12. Also in such a configuration, it is possible to make the detection light L2 incident on the light receiving section 13 by providing the light receiving section 13 at a position overlapping the radiation center of the light source section 12 in the Z-axis direction.

Fourth Embodiment

Figure 13:
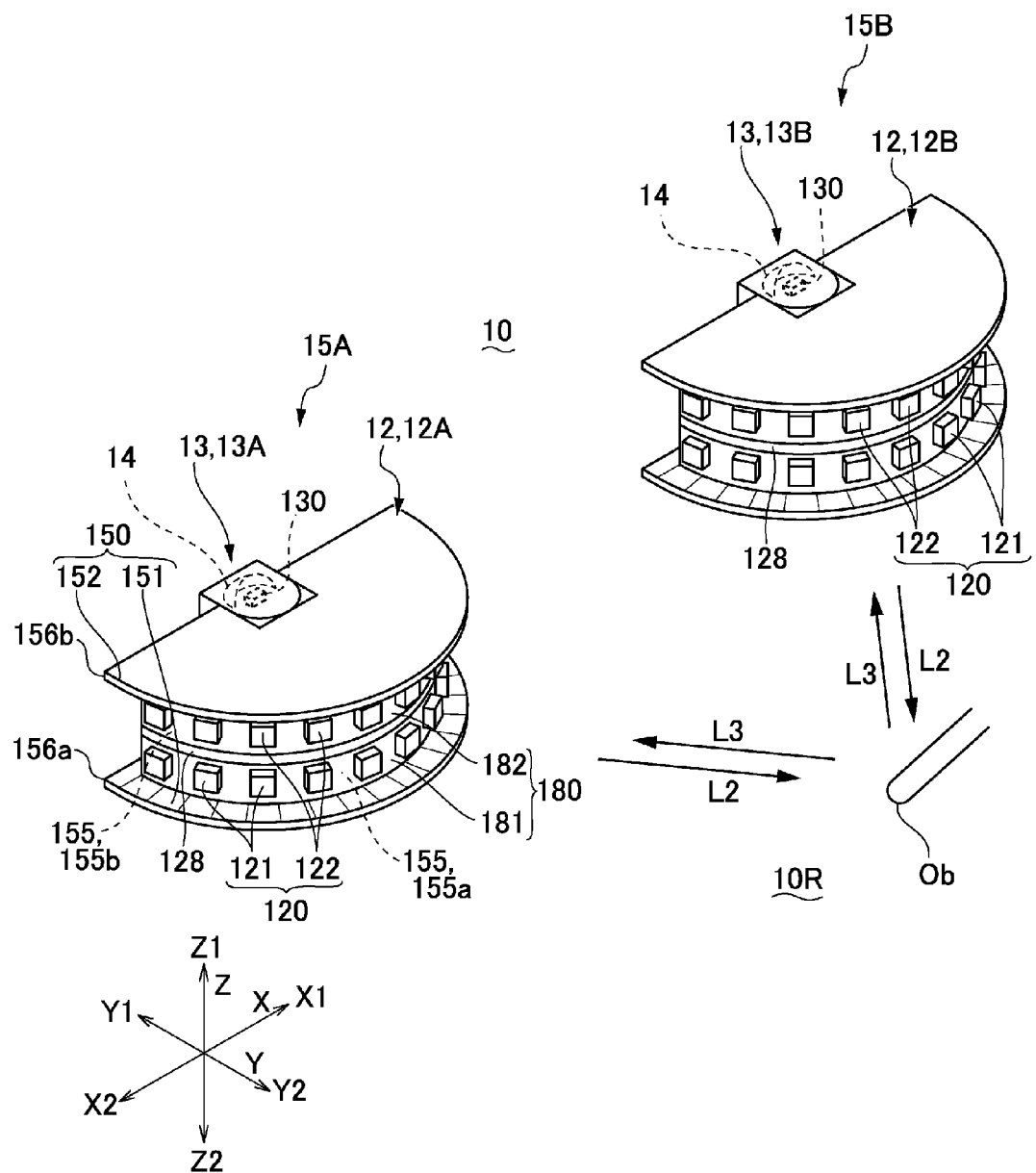
FIG. 13 is an explanatory view of a light emission and reception unit of an optical position detection device according to a fourth embodiment of the invention.
Figure 14A:
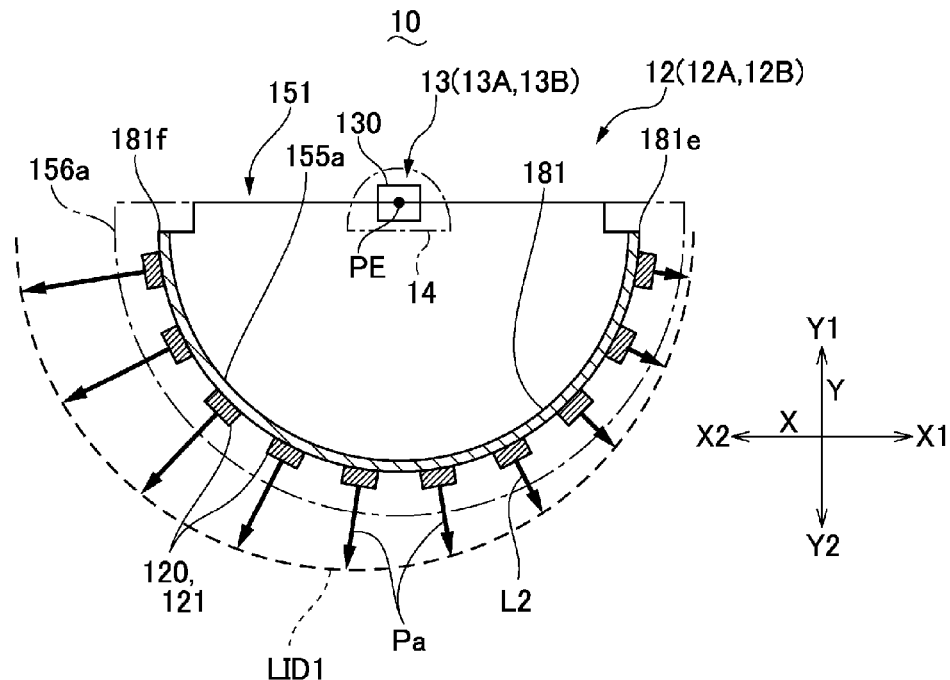
FIGS. 14A and 14B are explanatory views of a light source section of the light emission and reception unit shown in FIG. 13.
Figure 14B:
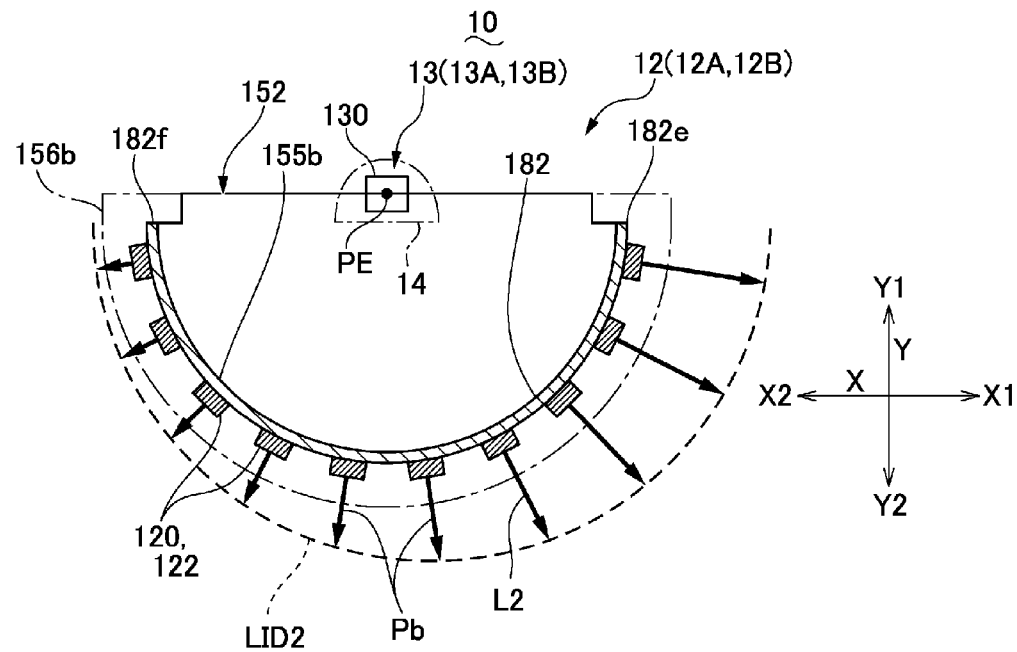

FIG. 13 is an explanatory view of a light emission and reception unit of an optical position detection device 10 according to a fourth embodiment of the invention. FIGS. 14A and 14B are explanatory views of the light source section in the light emission and reception unit shown in FIG. 13. FIG. 14A is an explanatory view showing a state where the detection light L2 is emitted at the time of first lighting operation in a first period, and FIG. 14B is an explanatory view showing a state where the detection light L2 is emitted at the time of second lighting operation in a second period. In addition, since the basic configuration in the present embodiment is the same as that in the first to third embodiments, the same components are denoted by the same reference numerals, and a duplicate explanation thereof will be omitted.

Although the light guide LG is used in the light source section 12 in the first to third embodiments, the XY coordinate of the target object Ob is detected in the same way as the first embodiment without using a light guide in the present embodiment. More specifically, as shown in FIG. 13, each of the light source sections 12 (first and second light source sections 12A and 12B) of the optical position detection device 10 according to the present embodiment includes the plurality of light sources 120 (first and second light sources 121 and 122), a belt-like flexible substrate 180 on which the plurality of light sources 120 are mounted, and the fan-shaped or semicircular light source support member 150 with a convex surface 155 which extends with a curved shape in the longitudinal direction (circumferential direction). In the present embodiment, the convex surface 155 has a curved shape in an arc in the longitudinal direction (circumferential direction).

In the present embodiment, a first belt-like flexible substrate 181 (first light source module) and a second belt-like flexible substrate 182 (second light source module) disposed in parallel to the first flexible substrate 181 in the width direction (Z-axis direction) are used as the flexible substrate 180. On the first flexible substrate 181, the plurality of first light sources 121 are mounted as the plurality of light sources 120 in the longitudinal (circumferential) direction of the first flexible substrate 181. On the second flexible substrate 182, the plurality of second light sources 122 are mounted as the plurality of light sources 120 in the longitudinal direction of the second flexible substrate 182. LEDs are used as the light sources 120.

In addition, in the two light source sections 12 (first and second light source sections 12A and 12B), the light source support member 150 has a structure in which the first and second light source support members 151 and 152 overlap each other in the Z-axis direction, and the first and second light source support members 151 and 152 are symmetrical in the Z-axis direction. The first light source support member 151 includes an arc-shaped convex surface 155a, which forms a lower half portion of the convex surface 155, and a fan-shaped or semicircular flange 156a protruding from the convex surface 155a at the opposite end to a side where the second light source support member 152 is located on the convex surface 155a. The first flexible substrate 181 is disposed on the convex surface 155a so as to overlap each other. The second light source support member 152 includes an arc-shaped convex surface 155b, which forms an upper half portion of the convex surface 155, and a fan-shaped or semicircular flange 156b protruding from the convex surface 155b at the opposite end to a side where the first light source support member 151 is located on the convex surface 155b. The second flexible substrate 182 is disposed on the convex surface 155b so as to overlap each other. Here, a portion interposed in the Z-axis direction by the first and second flexible substrates 181 and 182 is the transmissive light guide section 128, and the light receiving element 130 of the light receiving section 13 is disposed at the back of the light guide section 128.

To detect the position of the target object Ob in the space to be detected 10R in the optical position detection device 10 configured as described above, the plurality of first light sources 121 mounted on the first flexible substrate 181 and the plurality of second light sources 122 mounted on the second flexible substrate 182 are turned on in different periods. In this case, in the first lighting operation (first period) in which all of the plurality of first light sources 121 are turned on and all of the plurality of second light sources 122 are turned off, the emission intensity of the first light source 121 is decreased from the side, at which an end 181f at one side of the first flexible substrate 181 in the longitudinal (circumferential) direction is located, toward the side, at which an end 181e at the other side of the first flexible substrate 181 is located, as shown by the arrow Pa indicating the level of the emission intensity in FIG. 14A. Accordingly, in the first light intensity distribution LID1 of the detection light L2 emitted to the space to be detected 10R, the light intensity is high in the angular direction in which the end 181f at one side of the first flexible substrate 181 in the longitudinal (circumferential) direction is located, and the light intensity continuously decreases from there toward the angular direction in which the end 181e at the other side is located.

On the other hand, in the second lighting operation (second period) in which all of the plurality of second light sources 122 are turned on and all of the plurality of first light sources 121 are turned off, the emission intensity of the second light source 122 is increased from the side, at which an end 182f at one side of the second flexible substrate 182 in the longitudinal (circumferential) direction is located, toward the side, at which an end 182e at the other side of the second flexible substrate 182 is located, as shown by the arrow Pb indicating the level of the emission intensity in FIG. 14B. Accordingly, in the second light intensity distribution LID2 of the detection light L2 emitted to the space to be detected 10R, the light intensity is high in the angular direction in which the end 182e at the other side of the second flexible substrate 182 in the longitudinal (circumferential) direction is located, and the light intensity continuously decreases from there toward the angular direction in which the end 182f at the one side is located.

Therefore, if the first and second lighting operations are respectively executed in the first and second light source sections 12A and 12B, the position (XY coordinates) of the target object Ob can be detected in the same way as in the first embodiment. In this case, it is preferable to detect the angular position of the target object Ob on the basis of the sum (first driving current value) of driving currents supplied to the plurality of first light sources 121 and the sum (second driving current value) of driving currents supplied to the plurality of second light sources 122. In addition, when changing the emission intensities of the plurality of light sources 120, it is preferable to change a driving current of every light source 120 using a resistance element or the like.

Modification of the Fourth Embodiment

Although two light sources 120 are provided in the fourth embodiment described above, it is also possible to provide one light source 120 and to form light intensity distributions with opposite directions in the first and second periods by inverting the magnitude relationship between driving currents supplied to the plurality of light sources 120 in the first and second periods. In this case, if the light receiving section 13 is provided at the radiation center of the light source section 12, the incidence of the detection light L2 on the light receiving section 13 is interrupted by the light source section 12. Also in such a configuration, it is possible to make the detection light L2 incident on the light receiving section 13 by providing the light receiving section 13 at a position overlapping the radiation center of the light source section 12 in the Z-axis direction.

Fifth Embodiment

Figure 15:
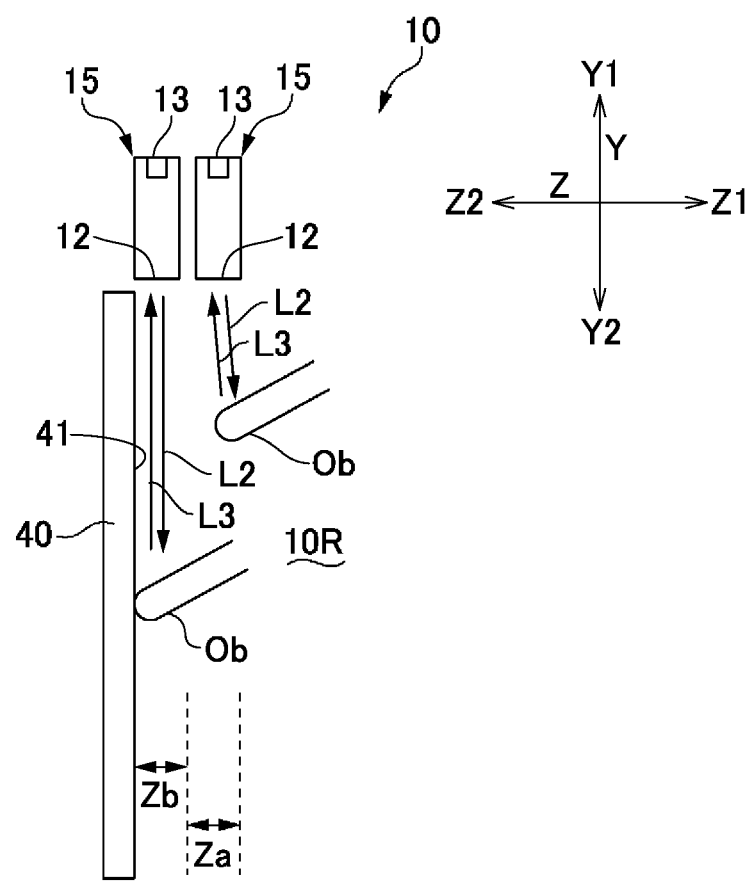
FIG. 15 is an explanatory view of an optical position detection device according to a fifth embodiment of the invention.

FIG. 15 is an explanatory view of the optical position detection device 10 according to a fifth embodiment of the invention, and shows a state when the optical position detection device 10 is viewed from the side (X-axis direction). In addition, since the basic configuration in the present embodiment is the same as that in the first to fourth embodiments, the same components are denoted by the same reference numerals, and a duplicate explanation thereof will be omitted.

As shown in FIG. 15, in the optical position detection device 10 according to the present embodiment, two light emission and reception units 15 are disposed so as to overlap each other in the Z-axis direction. Moreover, in the present embodiment, the detection range in the Z-axis direction in the light emission and reception unit 15 is narrow since the concave mirror 14 (not shown in FIG. 15) is used in the light receiving section 13 as in the first to fourth embodiments. Therefore, according to the present embodiment, it is possible to detect the position of the target object Ob in the Z-axis direction. That is, if the target object Ob is detected when operating the light emission and reception unit 15 provided at the position separated from the viewing surface 41 in the Z-axis direction and the target object Ob is not detected when operating the light emission and reception unit 15 provided at the position near the viewing surface 41 in the Z-axis direction, it can be determined that the target object Ob is at the position (range Za) separated from viewing surface 41. Accordingly, XY coordinate data of the current target object Ob can be used for determination of an expected input position. On the other hand, if the target object Ob is detected when operating the light emission and reception unit 15 provided at the position near the viewing surface 41 in the Z-axis direction, it can be determined that the target object Ob is at the position (range Zb) near the viewing surface 41. Accordingly, XY coordinate data of the current target object Ob can be used for determination of input decision.

In addition, although the two light emission and reception units 15 are disposed so as to overlap each other in the Z-axis direction in the present embodiment, the same detection can be performed even if only the two light receiving sections 13 (light receiving units) are disposed so as to overlap each other in the Z-axis direction.

Other Embodiments

In the first embodiment, arcuate and parabolic examples have been described as examples where the second cross section (YZ cross section) of the reflective surface 141 of the concave mirror 14 is a quadratic curve. However, it is also possible to adopt a structure in which the second cross section (YZ cross section) of the reflective surface 141 is a hyperbola among quadratic curves. In addition, although two central axes (axes of symmetry) are set in the hyperbola, the light receiving element 130 is disposed such that the arrangement center of the light receiving element 130 is located on the central axis passing along the inside of the hyperbola, from the point of view of the concave mirror 14.

Although two light source sections 12 are used in the embodiments described above, the position of the target object Ob may be detected using one light source section 12.
Example of the Configuration of a Position Detection System
First Specific Example of the Position Detection System 1

Figure 16:
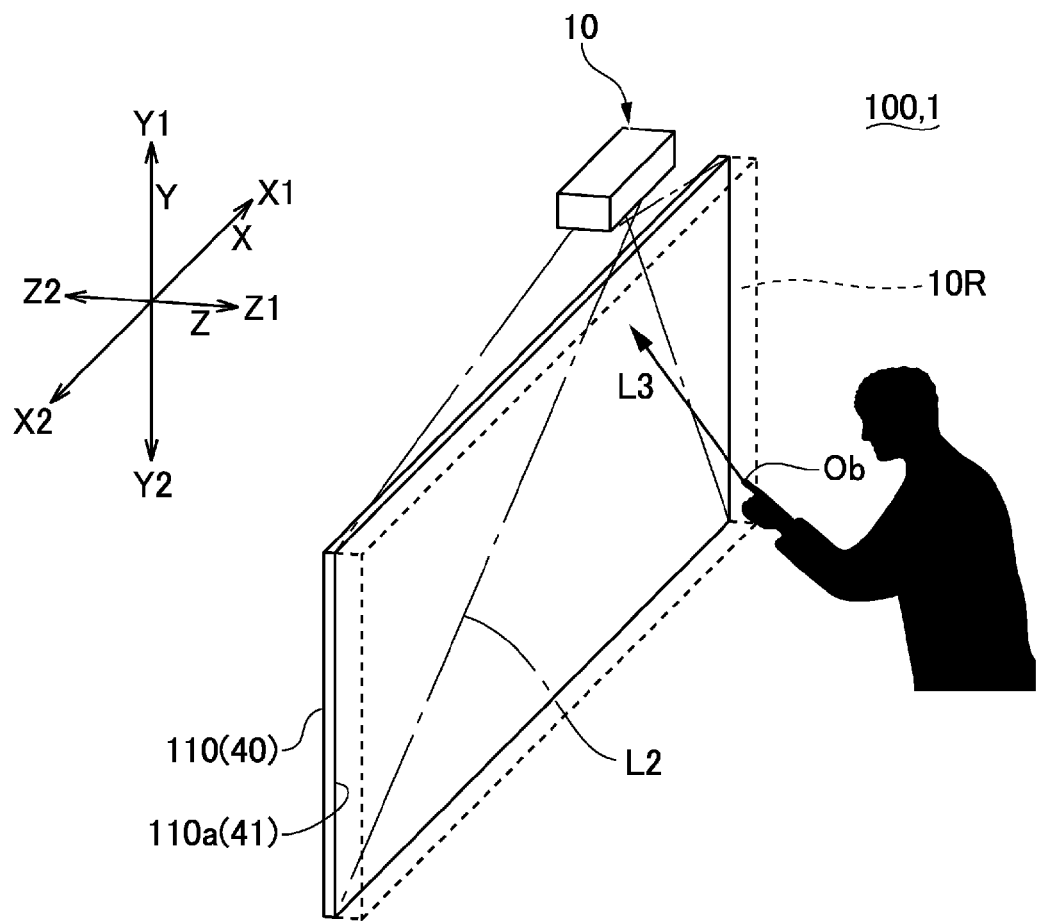
FIG. 16 is an explanatory view of a first specific example (a display system with an input function) of a position detection system to which the invention is applied.

FIG. 16 is an explanatory view of a first specific example (display system with an input function) of the position detection system 1 to which the invention is applied. In addition, in the display system with an input function according to the present embodiment, the configuration of the position detection system 1 and the optical position detection device 10 is the same as the configuration described with reference to FIGS. 1A to 15. Accordingly, the same components are denoted by the same reference numerals, and a duplicate explanation thereof will be omitted.

In the position detection system 1 according to the embodiment described above, if a display device 110 is used as the viewing surface forming member 40 and the optical position detection device 10 described with reference to FIGS. 1A to 15 is provided in the display device 110 as shown in FIG. 16, it can be used as a display system with an input function 100, such as an electronic blackboard or a digital signage. Here, the display device 110 (display unit) is a direct viewing type display device or a rear projection type display device having the viewing surface forming member 40 as a screen.

In the display system with an input function 100, the optical position detection device 10 emits the detection light L2 along a display surface 110a (viewing surface 41) and also detects the detection light L2 (reflected light L3) reflected from the target object Ob. Accordingly, since the position of the target object Ob can be detected if the target object Ob is brought close to part of an image displayed on the display device 110, the position of the target object Ob can be used as input information, such as an image switching instruction.
Second Specific Example of the Position Detection System 1

Figure 17:
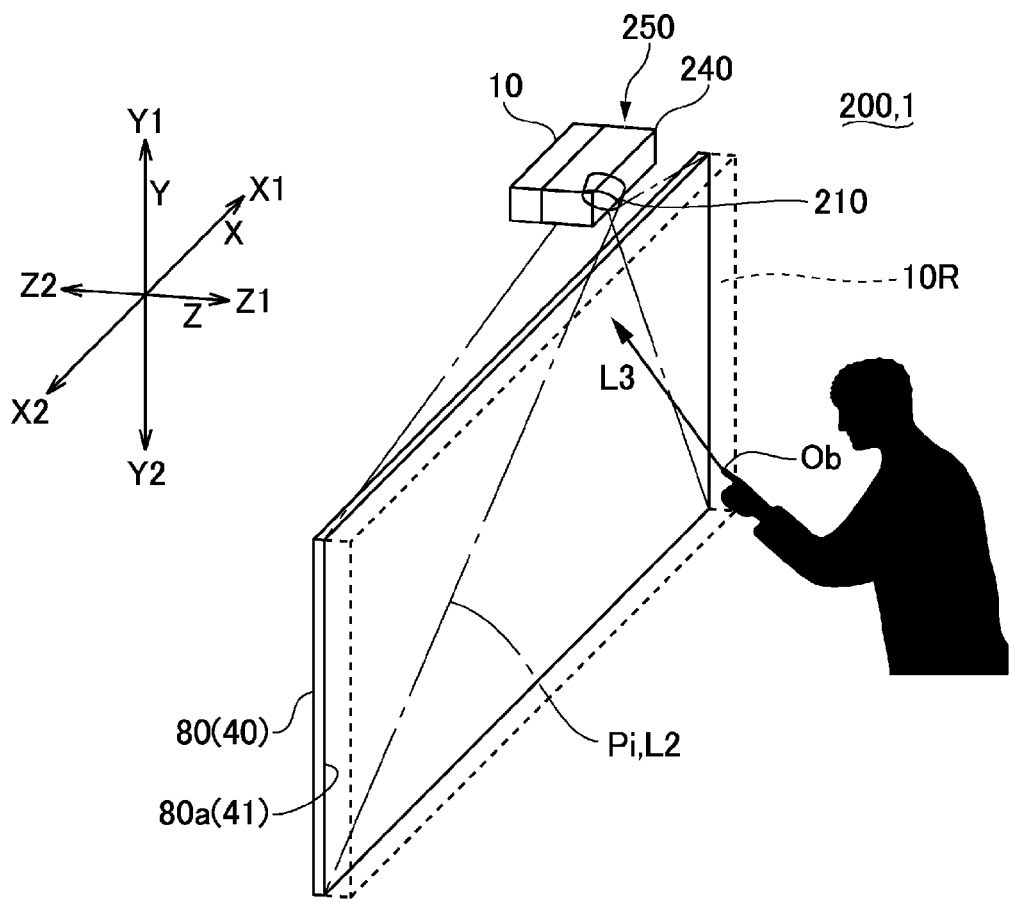
FIG. 17 is an explanatory view of a second specific example (a display system with an input function/projection type display system with an input function) of a position detection system to which the invention is applied.

Referring to FIG. 17, an example in which a projection type display system with a position function is formed using a screen as the viewing surface forming member 40 will be described. FIG. 17 is an explanatory view of a second specific example (display system with an input function/projection type display system with an input function) of the position detection system 1 to which the invention is applied. In addition, in the projection type display system with a position function according to the present embodiment, the configuration of the position detection system 1 and the optical position detection device 10 is the same as the configuration described with reference to FIGS. 1A to 15. Accordingly, the same components are denoted by the same reference numerals, and a duplicate explanation thereof will be omitted.

In a projection type display system with an input function 200 (display system with an input function) shown in FIG. 17, an image is projected from an image projection apparatus 250 (image generator), such as an LCD projector or a digital micromirror device, onto a screen 80 (viewing surface forming member 40). In the projection type display system with an input function 200, the image projection apparatus 250 (projection display unit) projects image display light Pi from a projector lens system 210, which is provided in a housing 240, toward the screen 80 in an enlarged manner. Here, the image projection apparatus 250 projects the image display light Pi toward the screen 80 from the direction slightly inclined from the Y-axis direction. Therefore, the viewing surface 41 through which the information is viewed is formed by a screen surface 80a of the screen 80 onto which an image is projected.

In the projection type display system with an input function 200, the optical position detection device 10 is added to the image projection apparatus 250 so that they are integrally formed. For this reason, the optical position detection device 10 emits the detection light L2 from a place, which is different from the projector lens system 210, along the screen surface 80a and also detects the reflected light L3 reflected from the target object Ob. Accordingly, since the position of the target object Ob can be detected if the target object Ob is brought close to part of an image projected on the screen 80, the position of the target object Ob can be used as input information, such as an image switching instruction.

In addition, if the optical position detection device 10 and the screen 80 are unified, a screen apparatus with an input function can be formed.

Other Specific Examples of the Position Detection System 1

In the invention, it is possible to adopt a configuration in which the viewing surface forming member 40 is a light transmissive member that covers an exhibit. In this case, the viewing surface 41 is a surface, on which the exhibit is viewed, at the opposite side to the side where the exhibit is disposed in the light transmissive member. With such a configuration, it is possible to form a window system with an input function or the like.

In addition, it is possible to adopt a configuration in which the viewing surface forming member 40 is a base that supports a mobile medium for games. In this case, the viewing surface 41 is a surface of the base located at the side where the relative position of the base and the medium for games is viewed. According to this configuration, amusement machines, such as a pachinko machine and a coin-operated game, can be formed as an amusement system with an input function and the like.

The entire disclosure of Japanese Patent Application No. 2011-084238 filed Apr. 6, 2011 is incorporated by reference.

What is claimed is:

1. An optical position detection device that detects a position of a target object, comprising:
   a light source section that emits detection light toward the target object, the detection light being distributed into a first light intensity distribution and a second light intensity distribution that is different from the first light intensity distribution;
   a light receiving section that has a light receiving element, the light receiving element receiving reflected light of the detection light reflected from the target object; and
   a position detecting section that detects the position of the target object based on a light receiving result of the light receiving section, wherein
   the first light intensity distribution and the second light intensity distribution are alternatively formed,
   the light receiving result includes at least two reflected light intensities corresponding to the first and second light intensity distributions, and
   the light receiving section includes:
      a concave mirror with a reflective surface, the reflecting surface having a first cross section and a second cross section perpendicular to the first cross section, the first cross section is an arc, and the second cross section is a quadratic curve; and
      the light receiving element that is located at the center of the arc in a plan view of the first cross section and on an axis of symmetry of the quadratic curve in a plan view of the second cross section.

2. The optical position detection device according to claim 1, wherein the light receiving element is located at the center of the quadratic curve.

3. The optical position detection device according to claim 1, wherein the quadratic curve is an arc.

4. The optical position detection device according to claim 3, wherein a radius of curvature of the arc of the second cross section is smaller than a radius of curvature of the arc of the first cross section.

5. The optical position detection device according to claim 1, wherein the quadratic curve is a parabola.

6. The optical position detection device according to claim 1, wherein a size of the arc and a size of the quadratic curve are different from each other.

7. An optical position detection device that detects a position of a target object, comprising:
   a light source section that emits detection light toward the target object, the detection light being distributed into a first light intensity distribution and a second light intensity distribution that is different from the first light intensity distribution;
   a light receiving section that has a light receiving element, the light receiving element receiving reflected light of the detection light reflected from the target object; and
   a position detecting section that detects the position of the target object based on a light receiving result of the light receiving section, wherein
   the first light intensity distribution and the second light intensity distribution are alternatively formed,
   the light receiving result includes at least two reflected light intensities corresponding to the first and second light intensity distributions, and
   the light receiving section includes:
      a concave mirror having a plurality of reflective surfaces, each reflective surface having a first cross section and a second cross section perpendicular to the first cross section, each first cross section is an arc, and each second cross section is a straight line, the plurality of reflective surfaces are arrayed along a normal line of the first cross sections; and the light receiving element that is located at the center of the arcs of the plurality of reflective surfaces in a plan view of the first cross sections, and an angle formed by a normal line of each of the reflective surfaces and the first cross section increases as a distance from the light receiving element increases along the normal line of the first cross sections.

8. The optical position detection device according to claim 7, wherein a size of the arc and a size of the straight line are different from each other.

9. A display system with an input function, comprising:
a light source section that emits detection light toward the target object, the detection light being distributed into a first light intensity distribution and a second light intensity distribution that is different from the first light intensity distribution;
a light receiving section that has a light receiving element, the light receiving element receiving reflected light of the detection light reflected from the target object;
a position detecting section that detects a position of the target object based on a light receiving result of the light receiving section; and
a display section switching an image displayed on a display surface based on a position detection result of the position detecting section, wherein
the first light intensity distribution and the second light intensity distribution are alternatively formed,
the light receiving result includes at least two reflected light intensities corresponding to the first and second light intensity distributions, and
the light receiving section includes:
a concave mirror with a reflective surface, the reflecting surface having a first cross section and a second cross section perpendicular to the first cross section, the first cross section is an arc, and the second cross section is a quadratic curve; and
the light receiving element that is located at the center of the arc in a plan view of the first cross section and on an axis of symmetry of the quadratic curve in a plan view of the second cross section.

10. The display system with an input function according to claim 9,
wherein the light receiving element is located at the center of the quadratic curve.

11. A display system with an input function, comprising:
a light source section that emits detection light toward the target object, the detection light being distributed into a first light intensity distribution and a second light intensity distribution that is different from the first light intensity distribution;
a light receiving section that has a light receiving element, the light receiving element receiving reflected light of the detection light reflected from the target object;
a position detecting section that detects a position of the target object based on a light receiving result of the light receiving section; and
a projection type display section switching a projected image based on a position detection result of the position detecting section, wherein
the first light intensity distribution and the second light intensity distribution are alternatively formed,
the light receiving result includes at least two reflected light intensities corresponding to the first and second light intensity distributions, and
the light receiving section includes:
a concave mirror with a reflective surface, the reflecting surface having a first cross section and a second cross section perpendicular to the first cross section, the first cross section being an arc, and the second cross section being a quadratic curve; and
the light receiving element that is located at the center of the arc in a plan view of the first cross section and on an axis of symmetry of the quadratic curve in a plan view of the second cross section.

12. The display system with an input function according to claim 11,
wherein the light receiving element is located at the center of the quadratic curve.

* * * * *